United States Patent
Forstall et al.

(10) Patent No.: US 8,185,149 B2
(45) Date of Patent: *May 22, 2012

(54) USER PROGRAMMABLE SWITCH

(75) Inventors: Scott Forstall, Mountain View, CA (US); Gregory Christie, San Jose, CA (US); Steven P. Jobs, Palo Alto, CA (US); Imran Chaudhri, San Francisco, CA (US); Patrick L. Coffman, Menlo Park, CA (US); Nitin Ganatra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,347

(22) Filed: Aug. 9, 2011

(65) Prior Publication Data

US 2011/0294552 A1     Dec. 1, 2011

Related U.S. Application Data

(63) Continuation of application No. 11/620,659, filed on Jan. 6, 2007, now Pat. No. 8,000,736.

(51) Int. Cl.
*H04M 1/00* (2006.01)
(52) U.S. Cl. .......... 455/550.1; 455/556.1; 455/428
(58) Field of Classification Search ........... 455/550.1, 455/428, 556.1
See application file for complete search history.

(56) References Cited

U.S. PATENT DOCUMENTS

| | | | |
|---|---|---|---|
| 5,973,666 A | 10/1999 | Challener et al. | |
| 6,856,259 B1 * | 2/2005 | Sharp | 341/5 |
| 7,224,410 B1 | 5/2007 | Gerstman | |
| 7,351,923 B2 | 4/2008 | Barthelet et al. | |
| 7,395,089 B1 | 7/2008 | Hawkins et al. | |
| 2005/0191969 A1 * | 9/2005 | Mousseau | 455/90.2 |
| 2005/0197166 A1 | 9/2005 | Lehto | |
| 2005/0202845 A1 | 9/2005 | Sasaki | |
| 2005/0260985 A1 | 11/2005 | Rader et al. | |
| 2006/0195801 A1 * | 8/2006 | Iwamura | 715/864 |
| 2006/0270463 A1 * | 11/2006 | Copperman | 455/567 |
| 2007/0004451 A1 | 1/2007 | Anderson | |
| 2007/0035616 A1 | 2/2007 | Lee et al. | |
| 2007/0225030 A1 | 9/2007 | Teague | |
| 2007/0238489 A1 | 10/2007 | Scott | |
| 2007/0243896 A1 * | 10/2007 | Maatta et al. | 455/550.1 |
| 2008/0029372 A1 | 2/2008 | Beerling | |
| 2008/0125179 A1 | 5/2008 | Hamada et al. | |

OTHER PUBLICATIONS

Motorola "V600 GSM" Manual, © Motorola Inc., 2004 http://www.motorola.com/mdirect/manuals/v600_manual_ENG.pdf.

* cited by examiner

*Primary Examiner* — Jinsong Hu
*Assistant Examiner* — Michael Nguyen
(74) *Attorney, Agent, or Firm* — Blakely, Sokoloff, Taylor & Zafman LLP

(57) ABSTRACT

The various methods and devices described herein relate to devices which, in at least certain embodiments, may include at least one mechanical switch for user to select a user profile interface setting and at least one processor for causing the device to respond to the mechanical switch. The mechanical switch may be dedicated for the purpose of switching profiles and may allow for a selection of a plurality of profiles. Further, in conjunction with an optional shift key, the user may select preferences programmed within a profile.

24 Claims, 16 Drawing Sheets

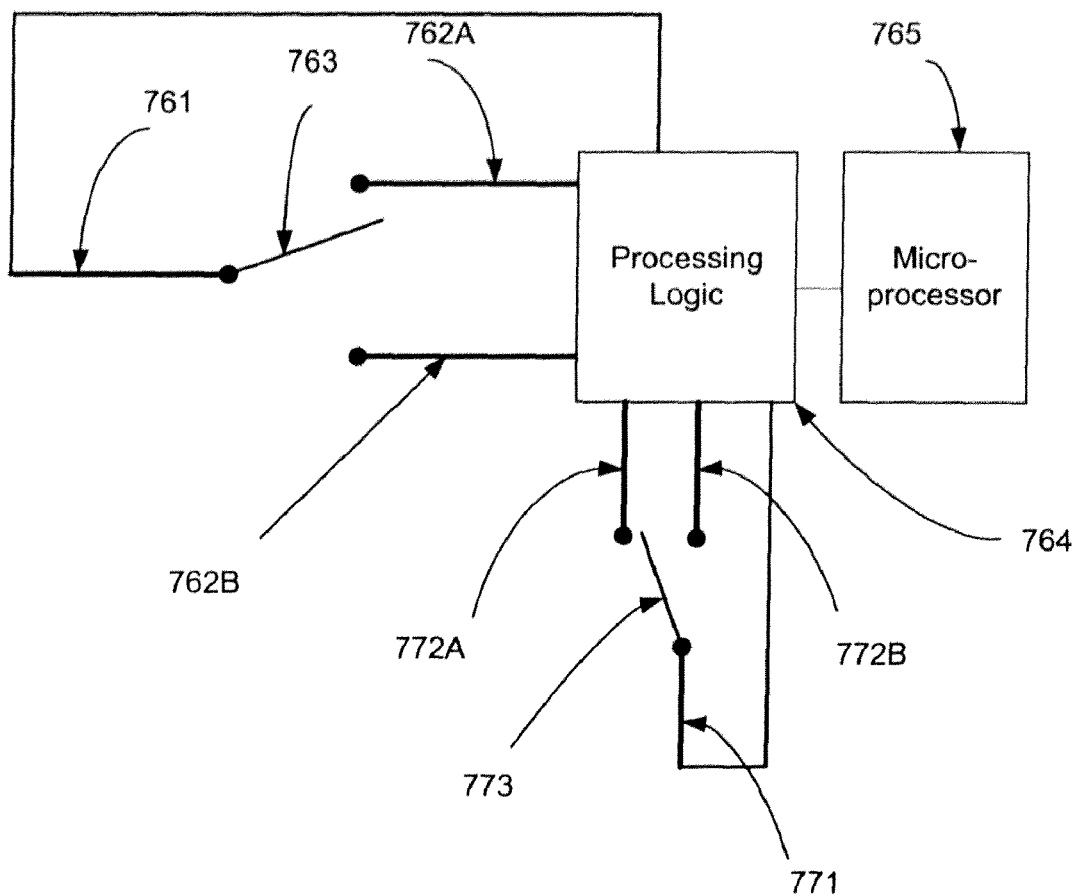

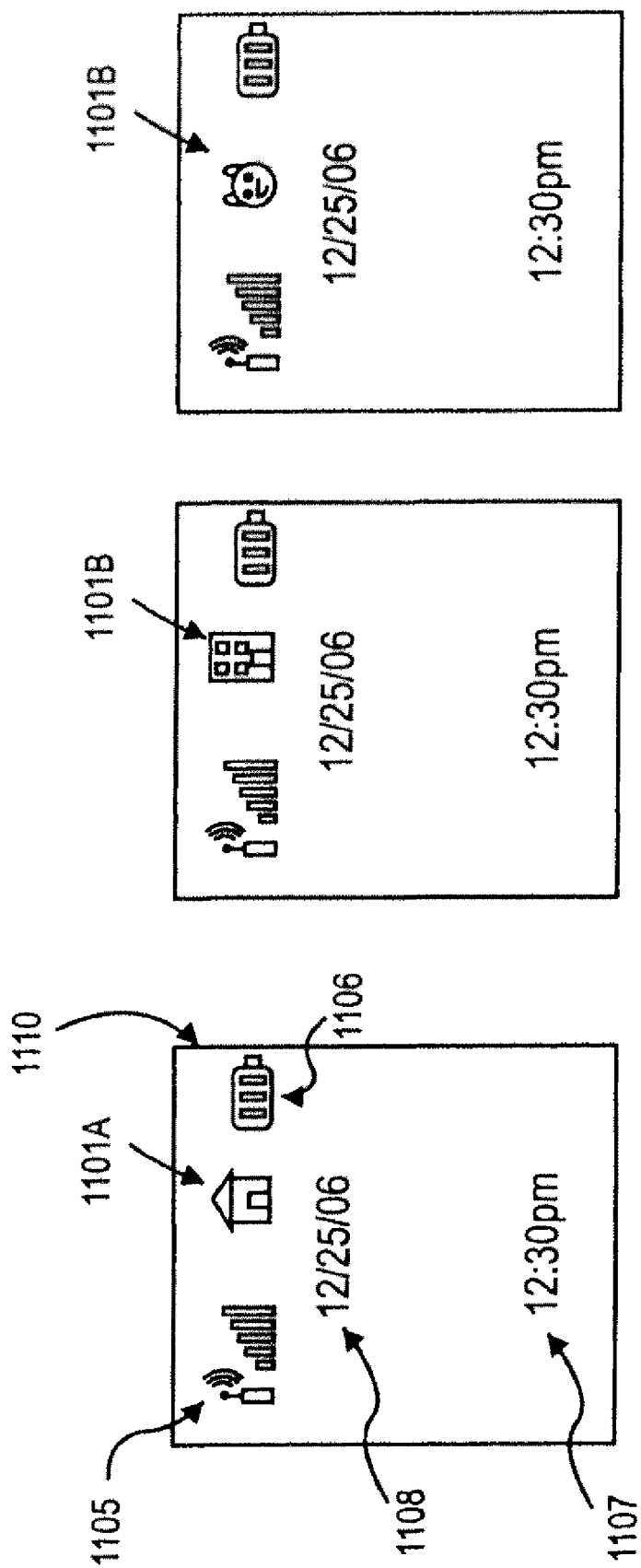

USER PROGRAMMABLE SWITCH

This application is a continuation of U.S. patent application Ser. No. 11/620,659, filed on Jan. 6, 2007 now U.S. Pat. No. 8,000,736.

FIELD OF THE INVENTION

This invention relates to the field of portable devices and, in particular, to systems and methods for switching or determining user preferences or profiles in settings related to operation of the portable devices and user activities.

BACKGROUND OF THE INVENTION

Portable devices, such as cell phones, personal digital assistants (PDAs) and in general, devices with wireless communication capabilities are becoming increasingly common. These portable devices have grown more complex over time, incorporating many features including, for example, MP3 player capabilities, photographing capabilities, web browsing capabilities, email capabilities, text messaging capabilities and the like.

The user of these portable devices, such as a cell phone incorporating web browsing, photograph taking, MP3 player, email and text messaging capabilities, range from teenagers to professionals. Often each user has his/her particular preferences in how the cell phone or PDA is set up. The set up may include display brightness, ring tone, ring volume, email notification, text notification, background display image, call forward, call volume, Bluetooth headset setup etc. For example, a teenager may prefer to have multiple set ups for different settings such as in school, at home, or at a party.

The teenager may prefer to have a unique music clip as ring tone, low volume, high power savings, and provocative background display while in school and amongst friends. However, the same person may prefer a traditional ring tone, low volume, moderate power savings (for playing games or playing music from MP3 player and a less distinct background display while at home. Similarly, the same person may want to have a silent ring tone and volume but using only vibration mode while keeping the same provocative background while in the library.

Typically, changing profile settings often require the user to make changes through the various menus in the user interface using the keypad when the phone is activated. For users who lead busy lives, such as professionals, who frequently transitions among different environments, like from a personal office into a meeting and into a public space, this method of changing profile settings becomes inconvenient. Users are often multi-tasking. Sometimes they simply do not even have minutes or even seconds to fidget with their phones to change profile settings suitable to the new environment or circumstances.

Consequent of the dynamic and fast paced lifestyle of users, a more convenient and less burdensome manner of changing user profile setting that can complement and keep up with the fast pace lifestyles is needed. There is a demand for a direct and simple manner in changing user profile on the fly without having to use the keypad and menus in the user interface.

SUMMARY OF THE DESCRIPTION

The various methods and devices described herein relate to devices which, in at least certain embodiments, may include at least one mechanical switch for users to select a user profile interface setting and at least one processor for causing the device to respond to the mechanical switch. The mechanical switch may be dedicated for the purpose of selecting a profile among a plurality of profiles. In other words, actuation of the switch may immediately and directly lead to a change in the user profile without the use of the menus and keypads in the user interface.

According to one embodiment of the present invention, a method to change a user profile interface setting includes: receiving an actuation of a dedicated mechanical switch with at least two switch positions on a portable data processing device to toggle between at least two programmable, mirrored user interface profile settings, receiving an electrical output corresponding to the actuation of the mechanical switch to each of the at least two switch positions, controlling a selection of parameters in the at least two programmable, mirrored user interface profile settings of the portable data processing device, and determining and selecting a preference in the at least two programmable, mirrored user interface profile settings.

The portable data processing device may be a telephone, such as a cell phone, or an integrated telephone and media player, or other types of devices such as a PDA that transmits and receives information as a means of communication. This device includes numerous user profiles. In one embodiment, all profiles may include a plurality of mirrored fields. However each field may have the same or different values across different profiles. Each field or setting has multiple different values or options. Each field controls an aspect of the interface for communication and each value or option indicates a different selection within the interface. The device includes a processing logic to process the interrupt request from the actuation of the mechanical switch to change profiles.

The switch may be any one of a variety of mechanical switches including, but not limited to, a typical linear sliding mechanical switch with two or more positions, a rotary switch where rotation of various different angles result in different switch positions, and a simple toggle switch. The switches are generally digital switches where each toggled position represents a logic state, however, an analog switch utilizing a potentiometer to change voltage may also be possible. For example, a linear sliding switch can have two or more positions wherein each position represents a profile setting. Similarly each position in a rotary switch and simple toggle switch can be a unique profile setting. In general, the mechanical switch is dedicated only to the changing of profile settings and each actuation of the mechanical switch may result in a change of the profile. In other words, there is an effect on the profile settings from each operation or actuation of the mechanical switch.

In certain embodiments, the device may include an optional shift key. The actuation or operation of the optional shift key by itself has no effect, but when simultaneously actuated and operated with the dedicated mechanical switch, a different output results compared to the actuation or operation of the mechanical switch by itself. For instance, three profiles are controlled by the operation of the mechanical switch, and each profile may have two sets of preferences. While the mechanical switch controls the toggling among different profiles, simultaneous operation of the optional optional shift key can allow toggling between the two preferences within each profile.

Various devices which perform one or more of the foregoing methods and machine readable media which, when executed by a processing system, cause the processing system to perform these methods, are also described. Other methods, devices and machine readable media are also described.

BRIEF DESCRIPTION OF THE DRAWINGS

The invention is described by way of example with reference to the accompanying drawings, wherein:

FIG. 2 is a perspective view of a portable device in accordance with one embodiment of the present invent on;

FIGS. 7A-C are examples of mechanical switches that can be implemented in a portable device in accordance with different embodiments of the present invention;

FIGS. 11A-C a are views of displays with different iconic representations of profiles selected for a portable device in accordance with one embodiment of the present invention;

DETAILED DESCRIPTION

Figure 1:
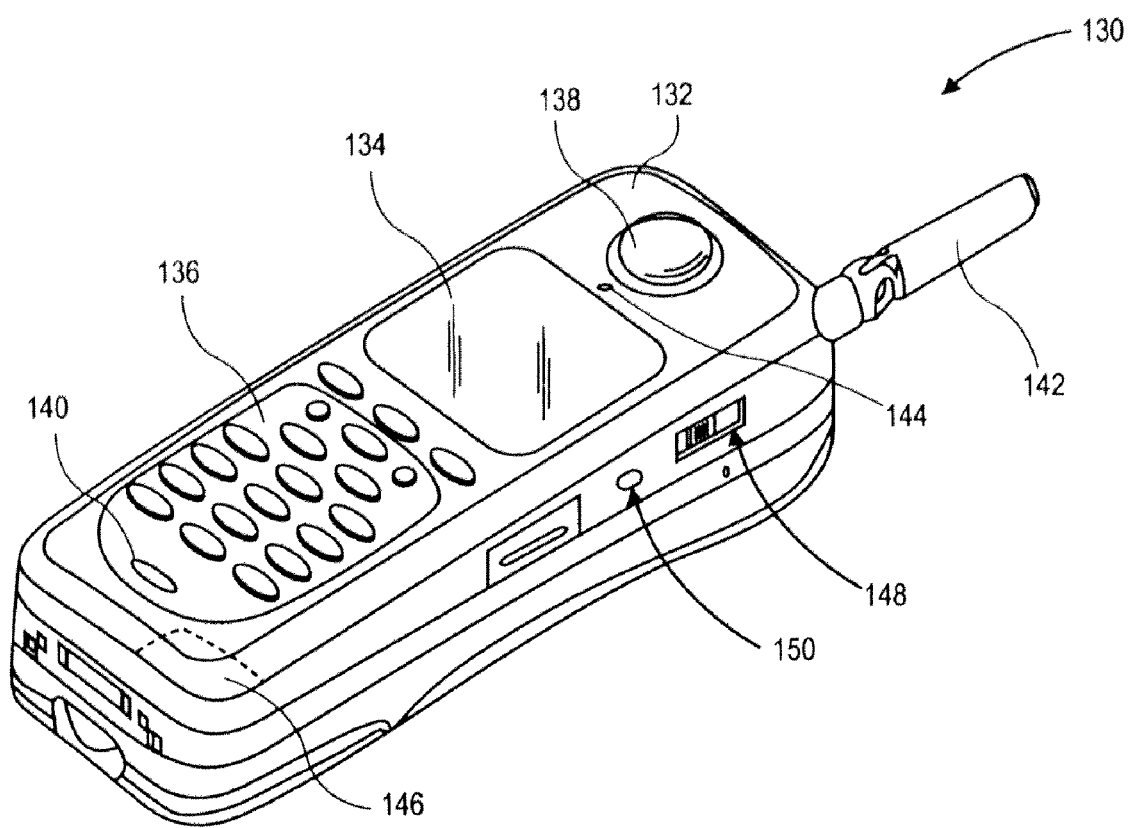
FIG. 1 is a perspective view of a portable device in accordance with one embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present invention relates to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

At least certain embodiments of the present inventions include one or more mechanical switches for users to change user profile interface communication settings. At least certain embodiments of the present invention calls for a dedicated switch where actuation of the switch effects directly in the changing of one user profile to a different profile or from one preference within a profile to a different preference within the same profile. At least certain embodiments of the present invention include an optional optional shift key used simultaneously with the actuation of the mechanical switch to provide more change options.

At least certain embodiments of the present inventions include one or more sensors to monitor user activity. At least certain embodiments of the present inventions also include automatically changing a state of the portable device based on user activity, such as, for example, automatically activating or deactivating a backlight of a display device of the portable device or setting an input device of the portable device to a particular state, based on certain predetermined user activities. Examples of such sensors and data processing devices containing such sensors can be found in U.S. patent application Ser. No. 11/586,862, which is incorporated herein by reference.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Embodiments of the inventions described herein may also include a variety of sensors. For example, proximity sensors may generate location or movement data or both, by detecting the direction, speed, and orientation (e.g., roll, pitch, yaw) etc. of objects relative to the portable device. Accelerometers may detect acceleration or deceleration of the portable device. They generate movement data for multiple dimensions to determine direction of movement of the portable device.

Embodiments of the invention described herein may also include a mechanical switch dedicated to changing of the profile of the interface communication settings. Portable devices have an interface and means for communication or obtaining attention of the user. The settings for such interface and communication to the user can be collectively grouped together as a profile. Thus, each actuation of the mechanical switch effects an electrical or logic output which in turn instructs the processor coupled to the switch to change profiles of the user interface communication settings predetermined in each of the profiles.

FIG. 1 illustrates a portable device 130 according to one embodiment of the invention. FIG. 1 shows a wireless device in a telephone configuration having a "candy-bar" style. In FIG. 1, the wireless device 130 may include a housing 132, a display device 134, an input device 136 which may be an alphanumeric keypad, a speaker 138, a microphone 140 and an antenna 142. The wireless device 30 also may include a proximity sensor 144 and an accelerometer 146. It will be appreciated that the embodiment of FIG. 1 may use more or fewer sensors and may have a different form factor from the form factor shown in FIG. 1.

The display device 134 is shown positioned at an upper portion of the housing 132, and the input device 136 is shown positioned at a lower portion of the housing 132. The antenna 142 is shown extending from the housing 132 at an upper portion of the housing 132. The speaker 138 is also shown at an upper portion of the housing 132 above the display device 134. The microphone 140 is shown at a lower portion of the housing 132, below the input device 136. It will be appreciated that the speaker 38 and microphone 140 can be positioned at any location on the housing, but are typically positioned in accordance with a user's ear and mouth, respectively, 132. It will be appreciated that the particular locations of the above-described features may vary in alternative embodiments.

The display device 134 may be, for example, a liquid crystal display (LCD) which does not include the ability to accept inputs or a touch input screen which also includes an LCD. The input device 136 may include, for example, buttons, switches, dials, sliders, keys or keypad, navigation pad, touch pad, touch screen, and the like. Any well-known speaker, microphone and antenna can be used for speaker 138, microphone 140 and antenna 142, respectively.

In one embodiment, the mechanical switch 148 may be located on the side of the portable device or the top of the portable device. Similarly an optional shift key or button 150 may be located on the side or top of the portable device. Actuation of the optional shift key 150 by itself does not cause any effect, and is only effective when pressed simultaneously during the actuation of another key or switch, such as the mechanical switch 148. In other embodiments, location of the mechanical switch 148 and the optional shift key 150 does not have to be on the side or top of the device, but may only be easily accessible when the device is stored in a pocket. In these embodiments, convenience of actuating the mechanical switch 148 and the optional optional shift key 150 is essential so that a single hand may actuate both concurrently. It should be noted that although a linear sliding switch is illustrated, other forms may include, but not limited to, a rotary switch, a rocker switch, a toggle switch and a tactile switch etc. may also be used. Similarly, the optional shift key can take on different forms such as a push button or a slider etc.

Figure 2:
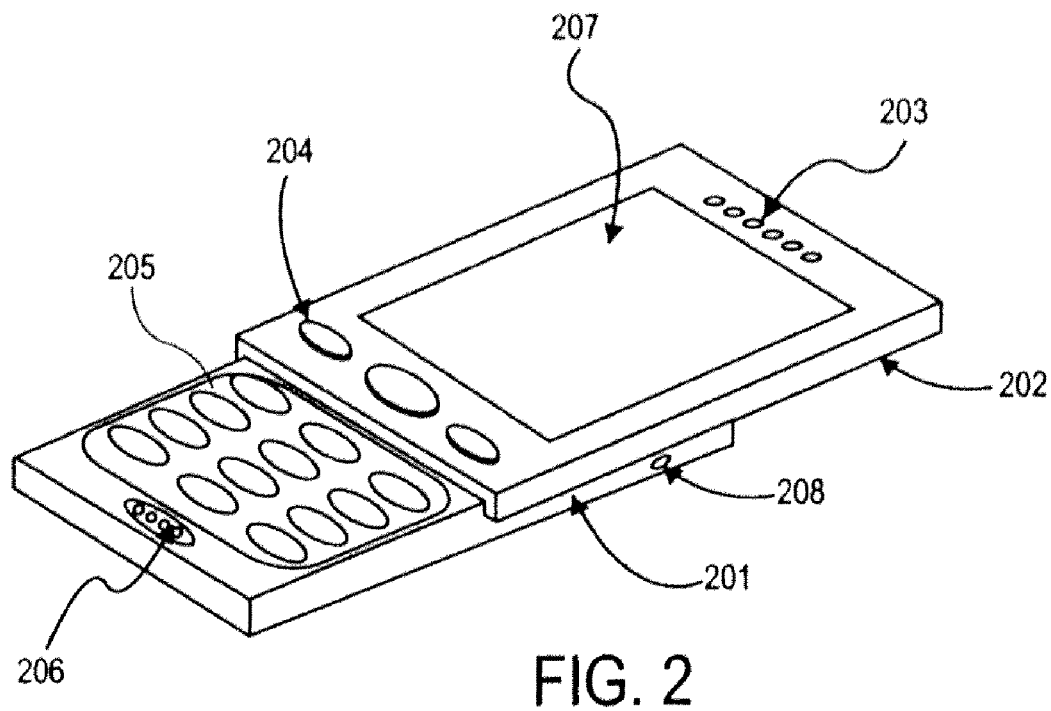

FIG. 2 illustrates a portable device 200 according to one embodiment of the invention. FIG. 2 shows a wireless device in a telephone configuration having a "slider" style. In FIG. 2, the wireless device 200 may include a slideable cover 202 that may include a display device 207 over a casing 201. There may be a speaker 203 included on the cover 202 and a microphone 206 on the casing 201 and/or on the cover 202. The input device may comprise an alphanumeric keypad 205 disposed on the housing 201 and buttons 204 on the cover 202. An antenna (not shown) is present but often not visible because it is disposed inside the casing. It will be appreciated that the locations of the features and number of the features may vary and the embodiment of FIG. 2 may have a different form factor from the form factor shown in FIG. 2.

The cover 202 may sometimes be a part of the casing, but often, at least a portion of the input device, generally a key pad, is hidden by the cover. Activation of the phone involves either actuation of buttons, dials, sliders, keys, touch screen, or touch pad on the cover or the sliding action of the cover to expose the input device hidden from sight. The speaker is generally located on the upper portion of the device while the microphone is located on the lower portion of the device. There is generally at least some keys or buttons 204 on the cover 202 near the display device 207.

In one embodiment, the mechanical switch may be positioned on the top of the sliding cover 202 or the top of the case 201 where accidental actuation of the switch based on handling of the device is minimized. The optional shift key 208 may be positioned on the side of the device at 90 degrees away from the mechanical switch. In this embodiment, actuation of both the mechanical switch and the optional shift key can be easily performed using one hand. In other embodiments, the positioning of either or both the mechanical switch and the optional shift key 208 can be arbitrarily placed on the exterior surface of the portable device with the only objective being easy access when the device is in a pocket or purse as well as ease of use such as a single hand or a one or two finger operation. Although a linear sliding switch is illustrated, other forms of switches such as a rotary switch, rocker switch, toggle switch and tactile switch etc. may also be used. Similarly, the optional shift key can take on other forms such as a push button or a slider etc.

Figure 3:
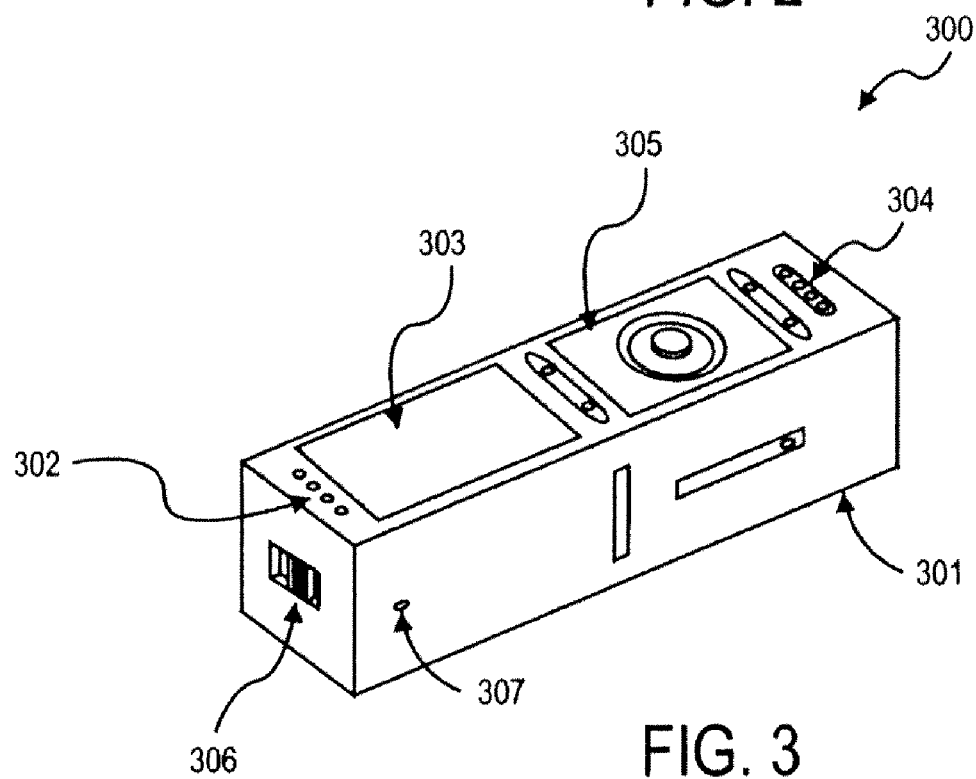
FIG. 3 is a perspective view of a portable device in accordance with one embodiment of the present invention.

FIG. 3 illustrates a portable device 300 according to one embodiment of the invention. FIG. 3 shows a wireless device in a telephone configuration having a "lipstick" style. In FIG. 2, the wireless device 300 may include a casing 301 on which a display device 303, an input device 305, a microphone 304 and a speaker 302 are disposed. This embodiment is unique from embodiments in that it is shaped like a rectangular or circular cylinder, and does not contain an alphanumeric keypad as its data input device. Keys, buttons, dials, sliders, and touchpad etc. forms the input device. The casing generally is in one piece and does not slide to expose any input elements like the "slider" style. However, the casing may slide minimally to expose a camera lens for the purpose of taking a photograph, if such a feature is available. Similar to previous embodiments, the antenna (not shown) may be visible or concealed within the casing for aesthetic purposes. It will be appreciated that the embodiment of FIG. 3 may have a different form factor from the form factor shown in FIG. 3.

In one embodiment, the mechanical switch 306 is positioned on top of the casing 301 with the optional shift key 307 on the side 90 degrees away. Similar to the positioning in FIG. 2, this configuration of the mechanical switch and the optional optional shift key may provide convenience and allow easy access in operation. In a device that is small like the illustrated embodiment in FIG. 3, besides ease of access and operation, another consideration for the positioning and configuration of the mechanical switch and the optional shift key is the available space on the exterior surface of the device. Such limitation may be as much a factor in determination of the positioning and location of the switch as are the aforementioned human factors. In other embodiments, the mechanical switch may take on forms such as a rotary switch, a rocker switch, a toggle switch and a tactile switch etc. Similarly, the optional shift key can take on other forms including, but not limited to, a push button or a slider etc.

Figure 4:
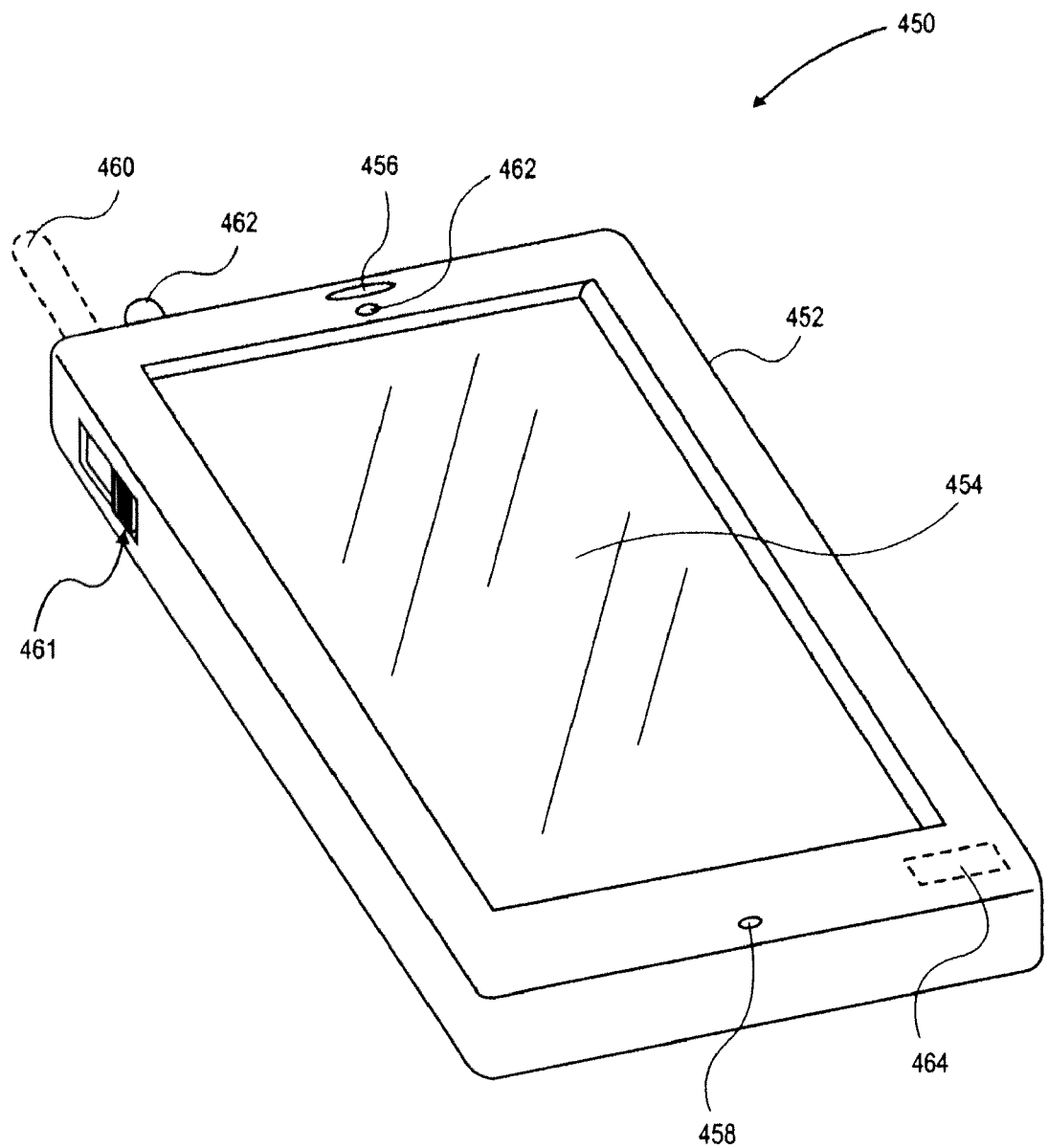
FIG. 4 is a perspective view of a portable device in accordance with one embodiment of the present invention.

FIG. 4 shows a portable device 450 in accordance with one embodiment of the invention. The portable device 450 may include a housing 452, a display/input device 454, a speaker 456, a microphone 458 and an optional antenna 460 (which may be visible on the exterior of the housing or may be concealed within the housing). The portable device 450 may be a cellular telephone or a device which is an integrated PDA and a cellular telephone or a device which is an integrated media player and a cellular telephone or a device which is both an entertainment system (e.g. for playing games) and a cellular telephone, or the portable device 450 may be other types of devices described herein. In one particular embodiment, the portable device 450 may include a cellular telephone and a media player and a PDA, all contained within the housing 452. The portable device 450 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, the display/input device 454 may include a multi-point touch input screen in addition to being a display, such as an LCD. In one embodiment, the multi-point touch screen is a capacitive sensing medium configured to detect multiple touches (e.g., blobs on the display from a user's face or multiple fingers concurrently touching or nearly touching the display) or near touches (e.g., blobs on the display) that occur at the same time and at distinct locations in the plane of the touch panel and to produce distinct signals representative of the location of the touches on the plane of the touch panel for each of the multiple touches. Additional information about multi-point input touch screens can be found in copending U.S. patent application Ser. No. 10/840,862, filed May 6, 2004 (see published U.S. patent application 20060097991), which is incorporated herein by reference in its entirety. A multi-point input touch screen may also be referred to as a multi-touch input panel.

In one embodiment, the mechanical switch (not shown) and the optional shift key (not shown) are positioned on the top of the housing. In another embodiment, the optional shift key may be on the side of the casing 452 while the mechanical switch is on the top of the housing. Similarly, placement of both the mechanical switch and the optional shift key is most often determined by human factors such as accessibility when the device is hidden (in a shirt pocket or pant pocket or in a purse), ease of operation (by one hand or two or less fingers) as well as physical space location limitation on the device. Besides the human factors and space limitations, positioning of the mechanical switch and the optional shift key is generally arbitrary. The mechanical switch may take the form of at least one of a rotary switch, a rocker switch, a toggle switch and a tactile switch etc., while the optional shift key can take on other forms such as a push button or a slider etc A processing device (not shown) may be coupled to the display/input device 454. The processing device may be used to calculate touches on the touch panel and/or responding to the outputs of a mechanical switch and/or the optional shift key. The display/input device 454 can use the detected touch (e.g., blob or blobs from a user's face) data to, for example, identify the location of certain objects and to also identify the type of object touching (or nearly touching) the display/input device 454.

In one embodiment, as shown in FIG. 4, the display/input device 454 occupies a large portion of one surface (e.g. the top surface) of the housing 452 of the portable device 450. In one embodiment, the display/input device 454 consumes substantially the entire front surface of the portable device 450. In another embodiment, the display/input device 454 consumes, for example, at least 75% of a front surface of the housing 452 of the portable device 450. In alternative embodiments, the portable device 450 may include a display which does not have input capabilities, but the display still occupies a large portion of one surface of the portable device 450. In this case, the portable device 450 may include other types of input devices such as a QWERTY keyboard or other types of keyboard which slide out or swing out from a portion of the portable device 450.

Figure 5A:
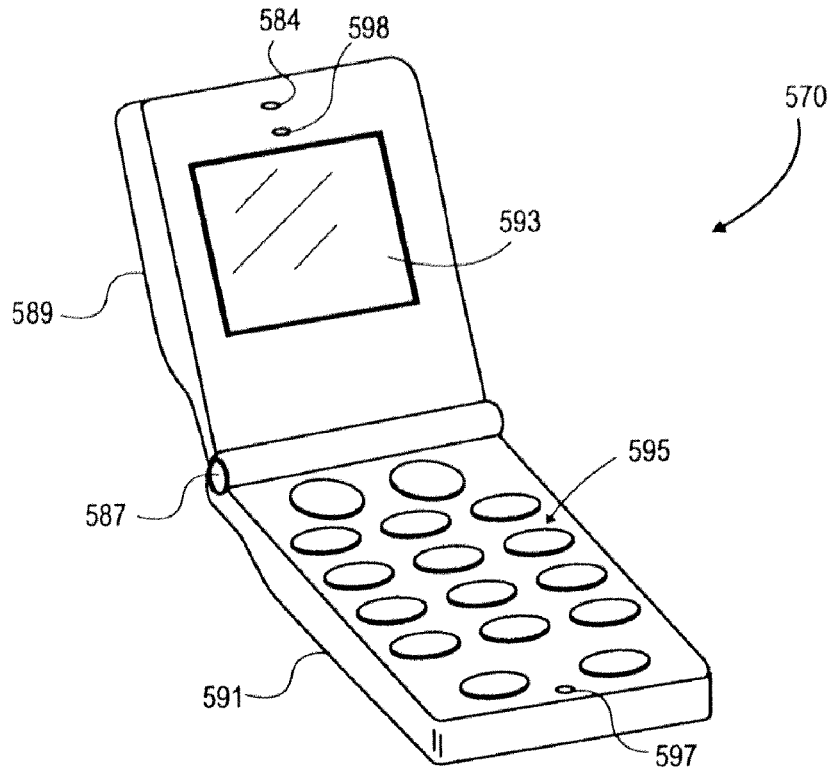
FIG. 5A is a perspective view of a portable device in a first configuration (e.g. in an open configuration) in accordance with one embodiment of the present invention.
Figure 5B:
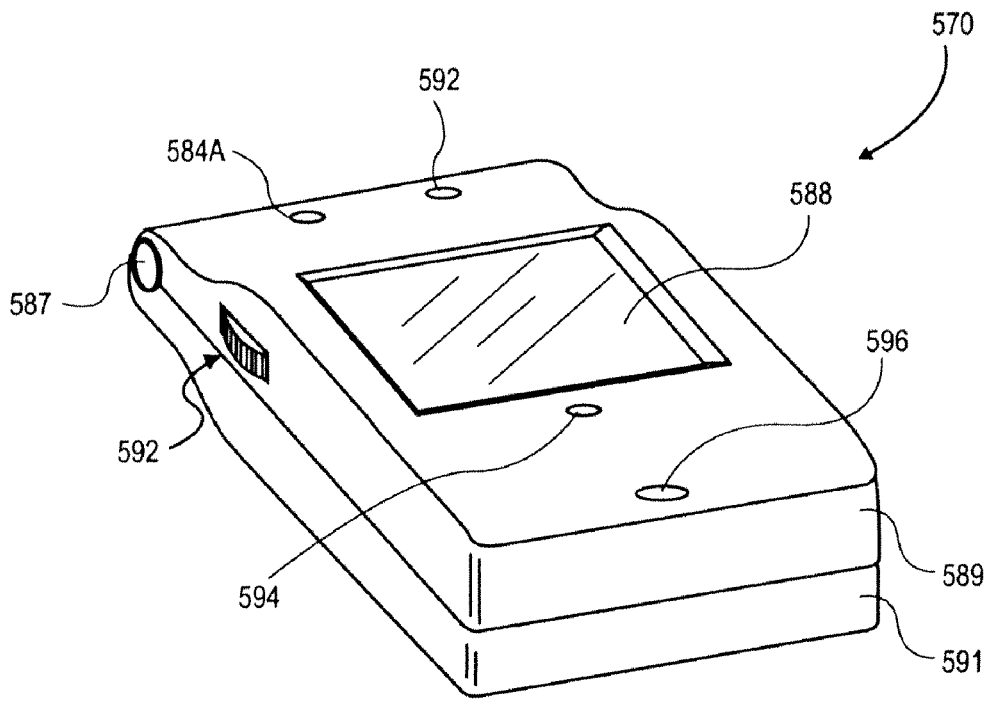
FIG. 5B is a perspective view of the portable device of FIG. 4A in a second configuration (e.g. a closed configuration) in accordance with one embodiment of the present invention.

FIGS. 5A and 5B illustrate a portable device 570 according to one embodiment of the invention. The portable device 570 may be a cellular telephone which includes a hinge 587 that couples a display housing 589 to a keypad housing 591. The hinge 587 allows a user to open and close the cellular telephone so that it can be placed in at least one of two different configurations shown in FIGS. 5A and 5B. In one particular embodiment, the hinge 587 may rotatably couple the display housing to the keypad housing. In particular, a user can open the cellular telephone to place it in the open configuration shown in FIG. 5A and can close the cellular telephone to place it in the closed configuration shown in FIG. 5B. The keypad housing 591 may include a keypad 595 which receives inputs (e.g. telephone number inputs or other alphanumeric inputs) from a user and a microphone 597 which receives voice input from the user. The display housing 589 may include, on its interior surface, a display 593 (e.g. an LCD) and a speaker 598 and a proximity sensor 584; on its exterior surface, the display housing 589 may include a speaker 596, a temperature sensor 594, a display 588 (e.g. another LCD), an ambient light sensor 592, and a proximity sensor 584A. Hence, in this embodiment, the display housing 589 may include a first proximity sensor on its interior surface and a second proximity sensor on its exterior surface. The first proximity sensor may be used to detect a user's head or ear being within a certain distance of the first proximity sensor and to cause an illumination setting of displays 593 and 588 to be changed automatically in response to this detecting (e.g. the illumination for both displays are turned off or otherwise set in a reduced power state). Data from the second proximity sensor, along with data from the ambient light sensor 592 and data from the temperature sensor 594, may be used to detect that the cellular telephone has been placed into the user's pocket.

In one embodiment, the mechanical switch (not shown) and optional shift key (not shown) are located on a surface of the keypad housing 591 on one edge and on a surface of the display housing 591 on an opposite edge. Having the mechanical switch and the optional shift key on opposite edges may allow for easier actuation of both concurrently. Other configurations such as having the mechanical switch and the optional shift key on either display or keypad casing at 90 degrees apart or on opposite edges of the same casing etc. are possible. The type of mechanical switch includes, but is not limited to, a rotary switch, a rocker switch, a slider switch and a toggle switch or the type of optional shift key that may include a push button or a slider etc. can be arbitrary but is often based on human factors and space available on the device as discussed earlier.

In at least certain embodiments, the portable device 570 may contain components which provide one or more of the functions of a wireless communication device such as a cellular telephone, a media player, an entertainment system, a PDA, or other types of devices described herein. In one implementation of an embodiment, the portable device 70 may be a cellular telephone integrated with a media player which plays MP3 files, such as MP3 music files.

Figure 6:
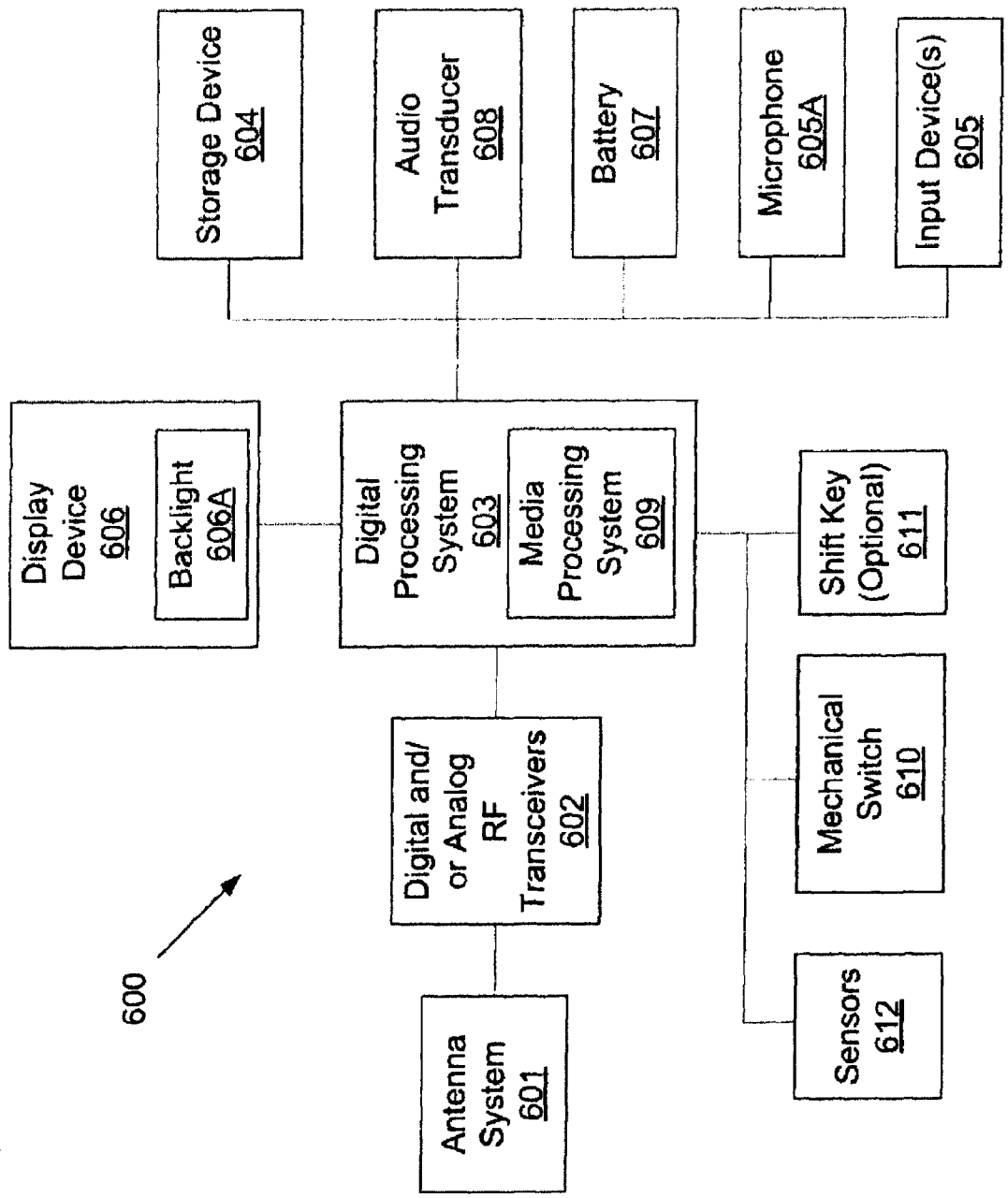
FIG. 6 is a block diagram of a system in which embodiments of the present invention can be implemented.

Each of the devices shown in FIGS. 1, 2, 3, 4, 5A and 5B may be a wireless communication device, such as a cellular telephone, and may include a plurality of components which provide a capability for wireless communication. FIG. 6 shows an embodiment of a wireless device 600 which includes the capability for wireless communication. The wireless device 600 may be included in any one of the devices shown in FIGS. 1, 2, 3, 4, 5A and 5B, although alternative embodiments of those devices of FIGS. 1-5B may include more or fewer components than the wireless device 600.

Wireless device 600 may include an antenna system 601. Wireless device 600 may also include a digital and/or analog radio frequency (RF) transceiver 602, coupled to the antenna system 601, to transmit and/or receive voice, digital data and/or media signals through antenna system 601.

Wireless device 600 may also include a digital processing system 603 to control the digital RF transceiver and to manage the voice, digital data and/or media signals. Digital processing system 603 may be a general purpose processing device, such as a microprocessor or controller for example. Digital processing system 603 may also be a special purpose processing device, such as an ASIC (application specific integrated circuit), FPGA (field-programmable gate array) or DSP (digital signal processor). Digital processing system 603 may also include other devices, as are known in the art, to interface with other components of wireless device 600. For example, digital processing system 603 may include analog-to-digital and digital-to-analog converters to interface with other components of wireless device 600. Digital processing system 103 may include a media processing system 609, which may also include a general purpose or special purpose processing device to manage media, such as files of audio data.

Wireless device 600 may also include a storage device 604, coupled to the digital processing system, to store data and/or operating programs for the wireless device 600. Storage device 604 may be, for example, any type of solid-state or magnetic memory device.

Wireless device 600 may also include one or more input devices 605, coupled to the digital processing system 603, to accept user inputs (e.g., telephone numbers, names, addresses, media selections, etc.) Input device 605 may be, for example, one or more of a keypad, a touchpad, a touch screen, a pointing device in combination with a display device or similar input device.

Wireless device 600 may also include at least one display device 606, coupled to the digital processing system 603, to display information such as messages, telephone call information, contact information, pictures, movies and/or titles or other indicators of media being selected via the input device 605. Display device 606 may be, for example, an LCD display device. In one embodiment, display device 606 and input device 605 may be integrated together in the same device (e.g., a touch screen LCD such as a multi-touch input panel which is integrated with a display device, such as an LCD display device). Examples of a touch input panel and a display integrated together are shown in U.S. published application No. 20060097991. The display device 606 may include a backlight 606a to illuminate the display device 106 under certain circumstances. It will be appreciated that the wireless device 100 may include multiple displays.

Wireless device 600 may also include a battery 607 to supply operating power to components of the system including digital RF transceiver 602, digital processing system 603, storage device 604, input device 605, microphone 605A, audio transducer 608, media processing system 609, sensor(s) 610, and display device 606. Battery 607 may be, for example, a rechargeable or non-rechargeable lithium or nickel metal hydride battery.

Wireless device 600 may also include audio transducers 608, which may include one or more speakers, and at least one microphone 605A.

Wireless device 600 may also include one or more sensors 610 coupled to the digital processing system 603. The sensor(s) 610 may include, for example, one or more of a proximity sensor, accelerometer, touch input panel, ambient light sensor, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof. Based on the data acquired by the sensor(s) 610, various responses may be performed automatically by the digital processing system, such as, for example, activating or deactivating the backlight 106a, changing a setting of the input device 605 (e.g. switching between processing or not processing, as an intentional user input, any input data from an input device), and other responses and combinations thereof.

Wireless device 600 may also include a mechanical switch 610 with or without an optional shift key 611. The mechanical switch is generally a digital logic switch but may also be an analog variable resistance switch. Examples of electronic switches may include but are not limited to any one of a single pole single throw, a single pole double throw, a double pole single thrown, a double pole, a double pole, a double pole changeover, a rotary, and a momentary contact etc. The output of the mechanical switch acts like an interrupt request sent by a processing logic to the microprocessor such that the microprocessor can be instructed to execute a specific set of directions. This interrupt request can generally be processed as long as the portable device is activated and in stand-by but not in active operation by the user. In this case, the specific directions would cause the profile settings to change or toggle from a current set to a different set. The optional shift key is added to provide more output states to the mechanical switch. While the mechanical switch can provide a limited number of outputs based on the switch positions available, the optional shift key can essentially at least double the set of outputs available to the mechanical switch alone.

In one embodiment, digital RF transceiver 602, digital processing system 603 and/or storage device 604 may include one or more integrated circuits disposed on a printed circuit board (PCB).

Figure 7A:
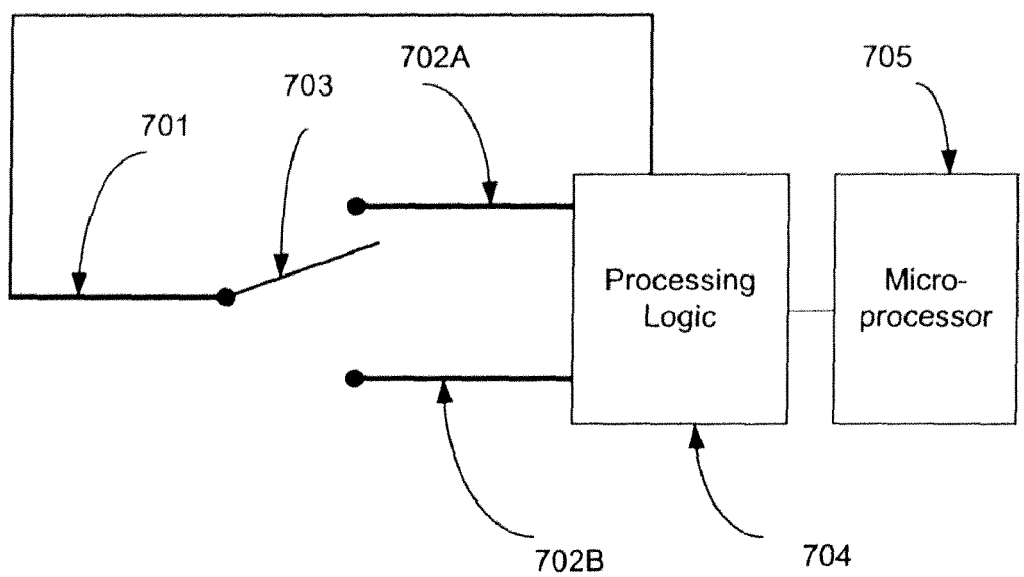
Figure 7B:
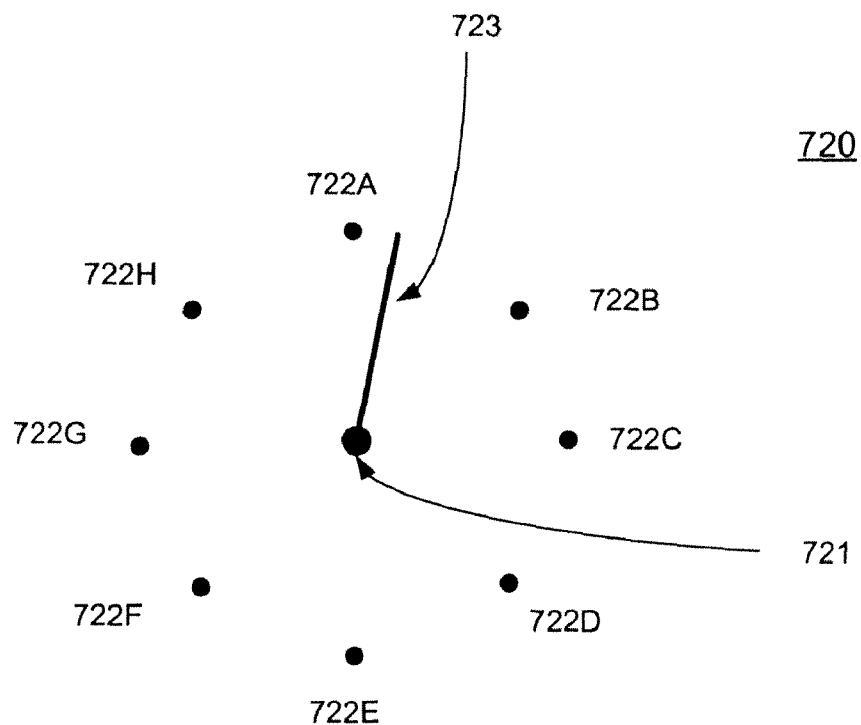

The electrical aspect of mechanical switches will now be described. In this section, the electrical or digital changes in a circuit in response to actuation of a mechanical switch will be discussed. FIGS. 7A-7C illustrate examples of mechanical switches that can be implemented in a portable device in accordance with different embodiments of the present invention. FIG. 7A illustrates a single pole double throw (SPDT) switch 700. The terms pole and throw are used to describe switch contacts as is known in the art. In FIG. 7A the output of the circuit changes depending on whether the pole contact 703 connects the pole 701 to either the first throw contact 702A or the second thrown contact 702B in forming a complete circuit with the processing logic. In other words, the mechanical actuation of the switch with two positions can have two choices of outputs for the complete circuit, 702A or 702B. The processing logic 704 may be implemented as a set of digital logic gates which change an internal state in the processing logic as a result of a change in the position of the pole contact 703 and which provides a signal to indicate that the pole contact 703 has changed its position. This signal may cause an interrupt to be generated and directed to an interrupt controller. The processing logic 704 may be implemented in a variety of alternative ways (e.g., the processing logic 704 may store or show a state and be polled periodically by the microprocessor or a microcontroller.) The microprocessor 705 may be the main microprocessor of the system or an auxiliary microprocessor. Upon receiving the change of outputs, the processing logic 704 will send a signal (e.g., an interrupt request) to interrupt controller which asserts an interrupt signal to the microprocessor 705 to instruct the microprocessor to execute a specific set of instructions. In context of the present invention, the microprocessor 705 may cause the software or operating system of the portable device to change from one profile setting to another.

FIG. 7B illustrates a rotary switch which is another embodiment of a mechanical switch in accordance with the present invention. A rotary switch 720 as illustrated may have at least two or more different throw controls 722A-H connected by a pole contact 723 to the pole 721. A rotary switch operates similar to a SPDT switch except it has more outputs (multiple throw controls) than a SPDT switch. When the rotary switch is mechanically actuated to change from one throw control or position to another, there may also be a change in the electricity flow from between one throw control to another throw control and the pole. The advantage of a otary switch is that it may provide more positions, and thus more outputs, as compared to a linear slider switch, a push button switch, or a rocker switch that generally only has two positions each. Further, a rotary switch does not require much surface area on the portable device for implementation.

In one embodiment, manual actuation of the optional shift key alone may not cause any change in the portable device. Rather, the optional shift key may be manually actuated concurrently with the mechanical switch to effect a change in the profile setting of portable device. FIG. 7C illustrates one embodiment of the operation of an optional shift key in conjunction with a SPDT switch in accordance with the present invention. The SPDT switch and the optional shift key is connected to the processing logic 764 by independent circuits. The SPDT switch is represented by the pole 761, pole contact 763, and the two different throw controls 762A, B to obtain different outputs in the processing logic 764. The optional shift key is represented by pole 771, pole contact 773, and different thrown controls 772A, B. For example, when the optional shift key is not activated, the pole is connected to a first throw control 772A thus providing one voltage or current to the processing logic 704 giving the choice of two different outputs. When the optional shift key is continuously pressed and activated, the shift key's pole contact 773 may switch to throw control 772B such that a different output is obtained in the processing logic as opposed to being connected to throw control 772A. When the processing logic sees this new output and when the mechanical switch is activated concurrently during the activation of the optional shift key, it may interpret the signal as the user wanting to change to another particular profile. In the current example, the mechanical switch, a SPDT switch, only has two positions when the pole contact 773 is connected to throw contact 772A. When the pole contact 773 is connected to throw contact 772B, the mechanical switch, again has two positions, therefore, concurrent activation of the shift key and the mechanical switch allows the system to increase its total positions available for programming of user profiles to a total of 4. In a different embodiment, the profiles that are activated only by actuation of the mechanical switch may contain different number of fields as the profiles that are activated by the concurrent actuation of the shift key and the mechanical switch.

All aforementioned embodiments of switches described require manual actuation by the user of the portable device to control the changing of the output of the switch. It should be appreciated that all mechanical switches described and intended for use with the portable device each has a dedicated purpose. For example, each manual actuation of the switch will single purposely cause an effect or change in a state of the portable device, for example, the user profile interface communication settings. In other words, the mechanical switch has a single dedicated purpose only and that is to change the user profile setting in the portable data processing device.

Figure 8A:
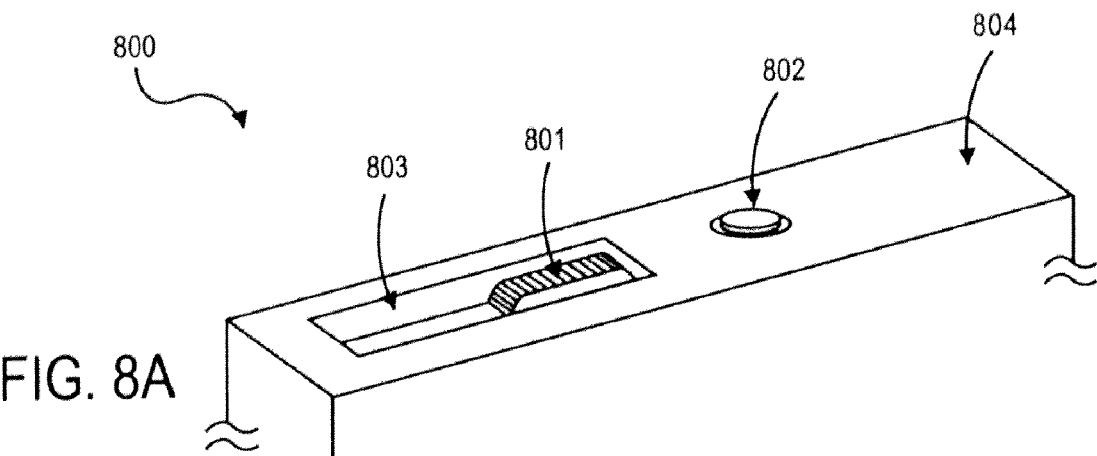
FIGS. 8A-C are perspective views of exemplary mechanical switches that can be implemented in a portable device in accordance with one embodiment of the present invention.

The mechanical aspects of a mechanical switch will now be described. In this section the different manners of mechanical actuation of a switch to cause a change in the electrical circuit will be discussed. FIGS. 8A-D illustrates various embodiments of a mechanical switch in accordance with the present invention. FIG. 8A illustrates a simple mechanical slider 801 switch with two or more positions. The slider 801 in this embodiment is placed below the surface 804 of the portable device. Positioning below the surface 804 of the device prevents the slider 801 from being unintentionally actuated or repositioned from handling of the portable device. The void 803 in which the slider is positioned may be deep enough to hide at least the height of the slider 801 switch but not so deep as to prevent a user from actuating the slider with a finger. An optional shift key in the form of a push button 802 is positioned on the surface 804 of the portable device. It should be appreciated that the relative placement of the optional shift key and the mechanical switch can be in a different configuration as illustrated. As described earlier, the object of the placements of the optional shift key and the mechanical switch is based on physical space available on the available surfaces on the portable device and human factors that include ease of use and ease of access. In this embodiment, the push button 802 is only activated when the button is pressed down, the optional shift key is not activated when released. Other forms of optional shift key are also possible.

Figure 8B:
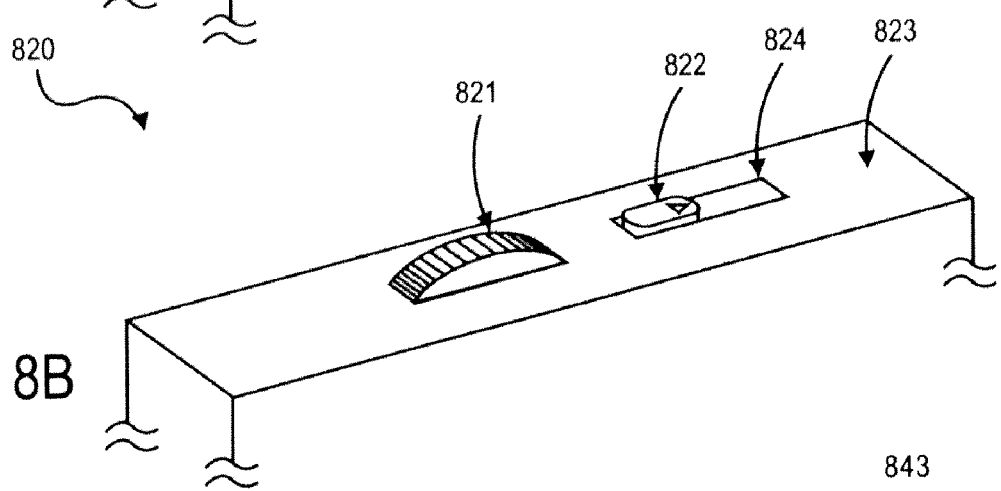

FIG. 8B illustrates another embodiment where a rotary switch 821 is positioned on the surface 823 on one edge of a portable device beside an optional shift key 822. The height of the rotary switch 821 rises above the surface 823 of the portable device for easy actuation by one finger. However, the rotary switch 821 does not have to be above the surface 823 and can instead be below the surface 823 similar to the embodiment disclosed in FIG. 8A. The rotary switch 821 has multiple rotary positions and each position results in a unique output. The optional shift key 822 displayed in FIG. 8B is a slider 822. The optional shift key 824 is activated when a user slides and holds slider 822 to a position opposite to its normal position. When released, the spring action in the slider switch 822 will return to its normal position and the optional shift key 824 will no longer be active. It should be appreciated that the mechanical switch and the optional shift key may not be of the aforementioned combination. For instance, the mechanical switch can be a rotary switch as in FIG. 8B and a push button as in FIG. 8A, or conversely a slider mechanical switch as in FIG. 8A and a slider optional shift key as in FIG. 8B.

Figure 8C:
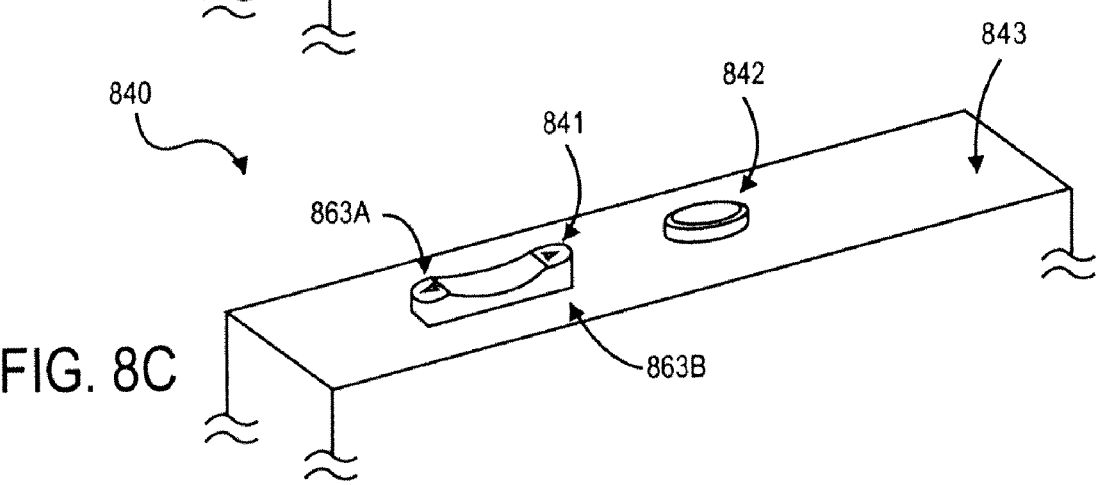

FIG. 8C illustrates another embodiment where a rocker switch 841 is positioned on a surface of the edge of a portable device. An optional shift key in the form of a push button 842 is positioned beside the rocker switch. A rocker switch 841, for example, has two mechanical positions where each controls a different output when the rocker switch 841 is pressed down on either end 863A or 863B. As in embodiments of mechanical switches illustrated earlier, placements of the rocker switch 861 in relation to the optional shift key may not be on a same surface of the portable device but may be arbitrary or designed based on human factors. Furthermore, the combination of the type of mechanical switch and the type of optional shift key can be arbitrarily determined or designed based on how easily the type of switch can be actuated concurrently with the type of optional shift key that provides maximum user operability. Similarly, for example, the rocker switch may be positioned below the surface 843 of the device such that accidental actuation of the switch from handling of the device is minimized.

Programming of the mechanical switch and the optional settings provided by the optional shift key will now be described. In one embodiment, each of the mechanical switch positions may correspond to a user profile interface communication setting in the portable device. In other words, a user can program each switch position independently so that actuation of the mechanical switch to a certain position will result in activation of a corresponding specific profile. In one embodiment, each profile may include multiple mirrored fields. This means the same fields, each being unique from another, are found in each profile. Therefore, each profile is a mirror image because each contains the same fields as in another. Each of these fields has multiple values for the user to select and similarly, the values available for programming may be the same in a particular unique field in one profile as in a second profile. However, the values appearing in the same field in different profiles can be same or different after a user has made selections of values in those fields.

Figure 10A:
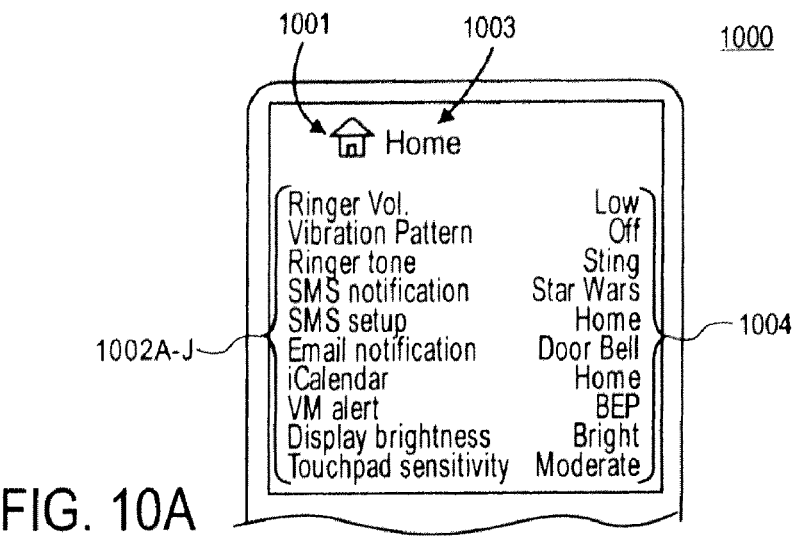
FIGS. 10A-C are views of different profiles on a display of a portable device in accordance with one embodiment of the present invention.
Figure 10B:
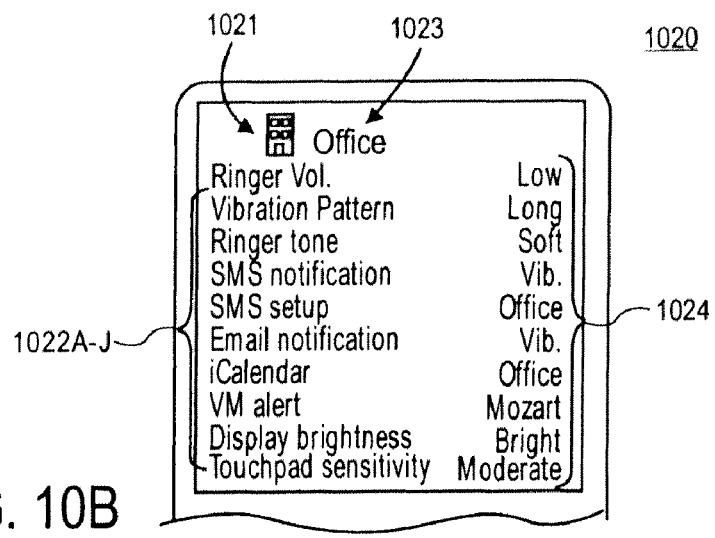
Figure 10C:
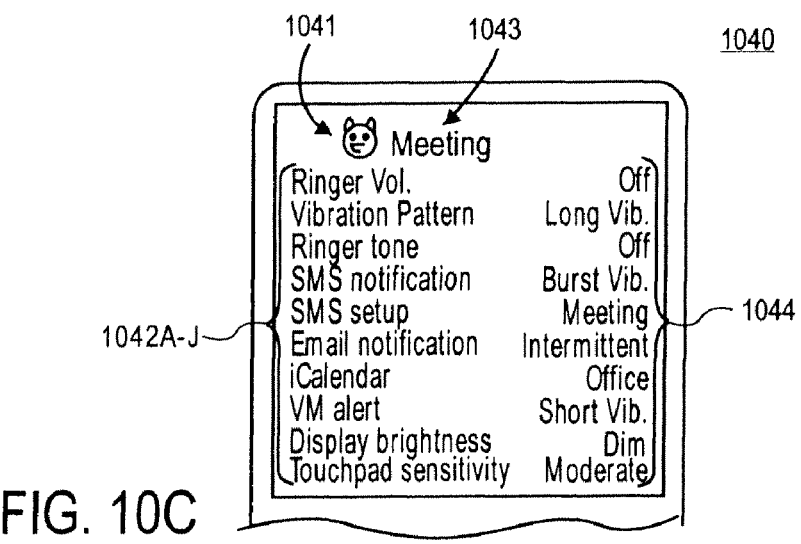

FIGS. 10A-C illustrate one embodiment of the mirrored profiles as described in the previous paragraph. FIGS. 10A, 10B, 10C are representations of three different profiles, Home 1000, Office 1020, and Meeting 1040 respectively. On each of the portable device display is an icon 1001, 1021 and 1041 and a name 1003, 1023 and 1043 representing each of the three different profiles respectively. The location of the icon and name may not be at the top of the display and can be arbitrarily displayed. Nonetheless, some indication and representation, whether iconic or by alphanumeric indication on the display to describe the profile chosen or is currently active is generally desirable. Each profile is seen to contain the same mirrored fields 1002A-J, 1022A-J and 1042A-J. Note that the same fields appear in each profile, thus rendering the profiles to be "mirrored" because of the mirrored fields. Note also that each field within a profile is unique and different from another. However, it should be noted that the values 1004, 1024 and 1044 are not necessarily mirrored from one profile to another. In other words, the value selected by a user in a particular field is likely to be different in different profiles. Therefore, although the values from which a user can select in each field are the same, the value in a particular field across different profiles can be same or different. Furthermore, one should be aware that the fields in the profile may contain various aspects of a user interface setting. For example, iCalendar set up may be programmed to display different calendars under different profiles (e.g., home/personal calendar and office calendar). Similarly, the display brightness and touchpad sensitivity may also optionally be a part of the user profile. Other common fields that may be found in the user profile are ringer volume, vibration pattern, ringer tone, email notification and voice mail alert, as show in features 1002 A-J, 1022 A-J and 1042 A-J.

In another embodiment not shown, each mechanical switch position represents a unique profile, but the profiles for each mechanical position may not be mirrored or contain mirroring fields. This embodiment allows a user to select fields for each profile. While the same number of fields is available for selection in each profile, all the profiles may not include the same fields. For instance, assuming that the fields including, but not limited to, ringer volume, vibration pattern, ringer tone, SMS notification, SMS setup, Email notification, iCalendar setup, display brightness, touch pad sensitivity, font size and type, power savings settings, background image, and voice mail (VM) alert are the fields present for user customization in a profile, the user may only select ringer volume and ringer tone and choose a value for each of the two fields without choosing any of the other fields. In this instance, there will only be two fields in this profile. Since the other fields are not selected nor chosen, the values in those fields will be defaulted to either a pre-determined value or setting by the manufacturer or to a default value programmed by the user.

In yet another embodiment, an optional shift key in combination with a mechanical switch is used to increase the number of profile settings available to the user for programming. For example, if a mechanical switch has two positions, the user is limited to selecting and programming two profiles. With an optional shift key in one embodiment, a user's choice of profiles has doubled and increased to four because of the use of the optional shift key. In one embodiment, the optional shift key will allow a user to switch preferences within a profile. Furthermore, the profiles activated only by the use of a mechanical switch may have mirroring fields relative to each other, but differ from the fields that are activated only with the concurrent actuation of the shift key and the mechanical switch. The fields in the profiles activated only by the concurrent actuation of the shift key and the mechanical switch may mirror each other. In still another embodiment, all profiles may have mirroring fields or all profiles may have different number of fields regardless of where how the profile is activated.

Figure 9A:
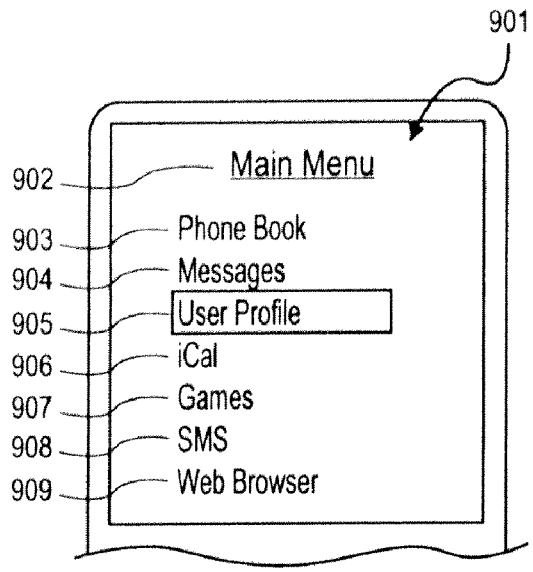
FIGS. 9A-G are views of the different menus on a display of a portable device when programming different settings in a profile, in accordance with one embodiment of the present invention.

FIGS. 9A-G illustrate one embodiment in which a user profile may be programmed in accordance with the present invention. FIGS. 9A-D show consecutive screen shots of a display of the portable device when a user customizes or programs settings in a user profile. FIG. 9A shows a main menu 901 of the portable device in a list view. The main menu 901 contains a title 902 on the top of the display and multiple different submenus 903-909 that allow the user to activate various applications of the portable device below the title. For example, a user can scroll down and select games 907 where the user can choose a game to play. In this case, the application to program user profile settings, User Profile 905 is selected.

Figure 9B:
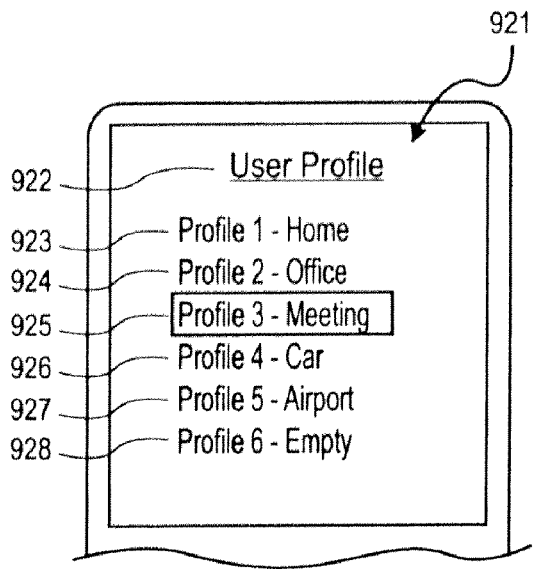

FIG. 9B illustrates the User Profile sub menu 921 with a title 922 named User Profile on top of the display and a list of profiles 923-925 below the title. The user can generate a limited number of different profiles determined by the maximum positions of a mechanical switch. This view lists 6 profiles, which in one embodiment may be represented by 6 different positions in a rotary switch. Profiles 1-5 923-927 have been programmed while profile 6 928 is empty. Other methods of displaying profiles may be employed. For example, the profiles may not be numbered, but instead be represented by icons. In the present instance, Profile 3, Meeting 925 is selected.

Figure 9C:
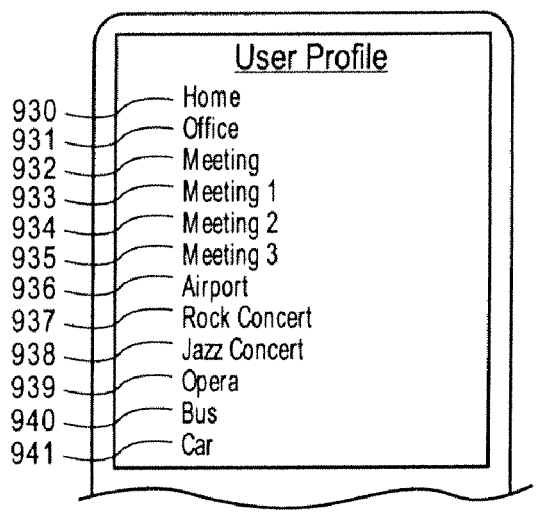

FIG. 9C shows a different embodiment of the User Profile and mechanical switch in accordance with the present invention. Similar to FIG. 9B, the User Profile has a sub menu and a title. However in this embodiment, a user may create and edit more user profiles than the number mechanical positions available. For example, in this embodiment, there are a total of eleven user profiles, listed as 930-940 when only 6 mechanical switch positions are available. In other words, it would be possible to have a User Profiles screen that does not contain profile numbers that correspond to the positions, but instead is simply a list of profiles (unbounded in length, or at least the length could be greater than the number of switch positions available.) Either a selection within each user profile may allow the assignment of a unique switch position to that profile, or, another screen may be used to actually assign profiles to the positions on the switch. In essence, a user may be able to create and edit multiple profiles and may freely choose to assign a unique user profile to each mechanical switch position. A user thus has the flexibility to create any number of user profiles containing any combination of user interface features as the user wishes. The user may freely select and assign any user profile to any mechanical position at any time.

Figure 9D:
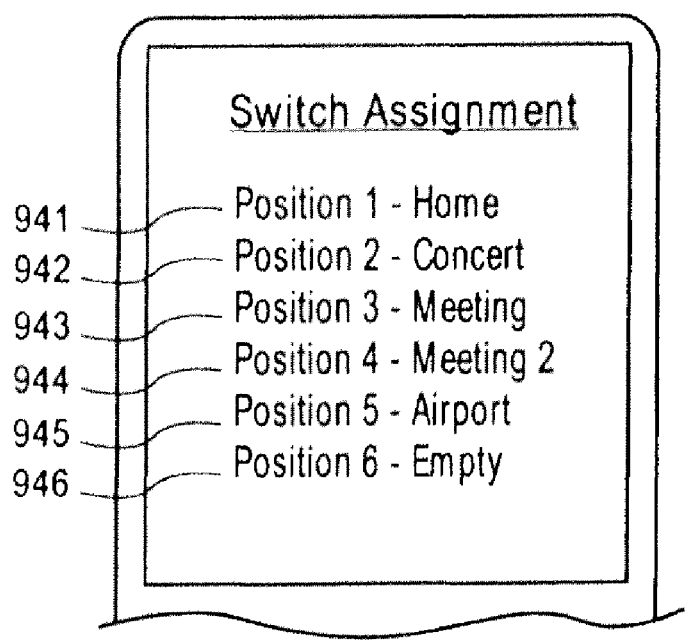
Figure 9E:
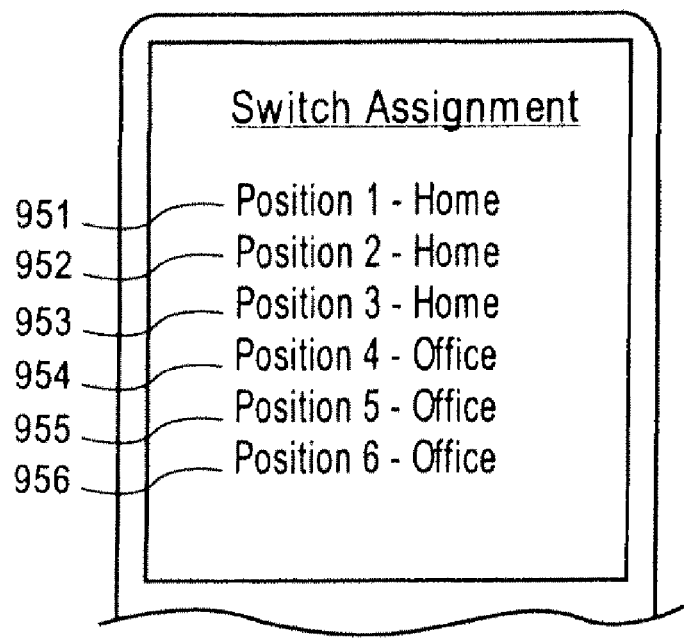

FIGS. 9D and 9E show two embodiments of assigning user profiles to switch positions in accordance with the present invention. FIG. 9D illustrates the assignment of a unique user profile to each mechanical switch position. For instance, in positions 1-6 corresponding to features 941-946, each mechanical position is uniquely matched to a particular user profile. No one user profile is assigned to more than one switch position. FIG. 9E on the other hand, illustrates a different embodiment where the assignment of user profiles to mechanical positions may be arbitrarily determined. For example, in positions 1-3 that correspond to features 951-953, the first three mechanical switch positions are all assigned to the same user profile "home", whereas, the last three mechanical switch positions 954-956 are all assigned to the same user profile "office". In contrast to FIG. 9D, this embodiment allows the flexibility for the user to freely assign any user profile to any mechanical position in a mechanical switch, where the same user profile may be assigned more than once and to different mechanical positions.

Figure 9F:
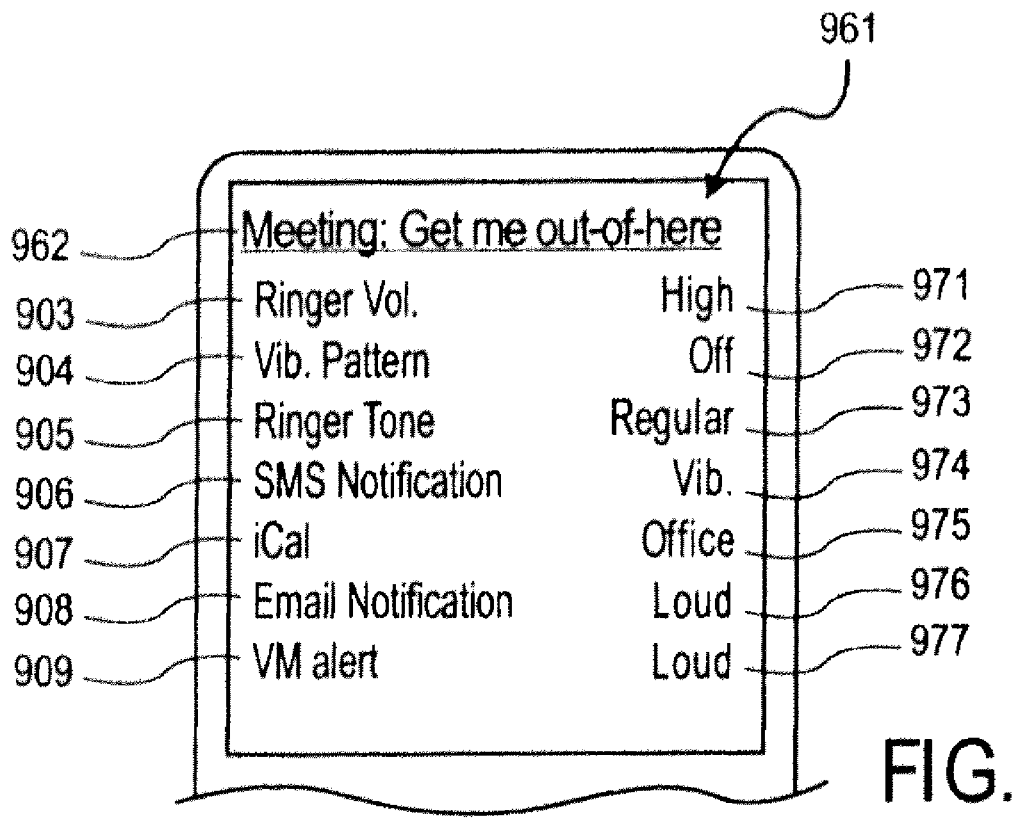

FIG. 9F shows the list of fields available in the profile and/or are selected in a profile. The title 962 is listed on the top of the display with a list of fields contained within the profile listed below. In the illustration, each of the fields 963-969 is different and the individual values that correspond to the different fields collectively represent a unique user profile. In an embodiment of mirrored profiles, the same fields and number of fields may be the same between different profiles. In a different embodiment where the profiles are not mirrored, the fields and number of fields in each of the profiles may differ across profiles. In this view, the values 971-977 selected by the user corresponding to the fields are listed to the right of the fields 963-969. The field or setting of SMS notification 969 is selected which can then be modified.

Figure 9G:
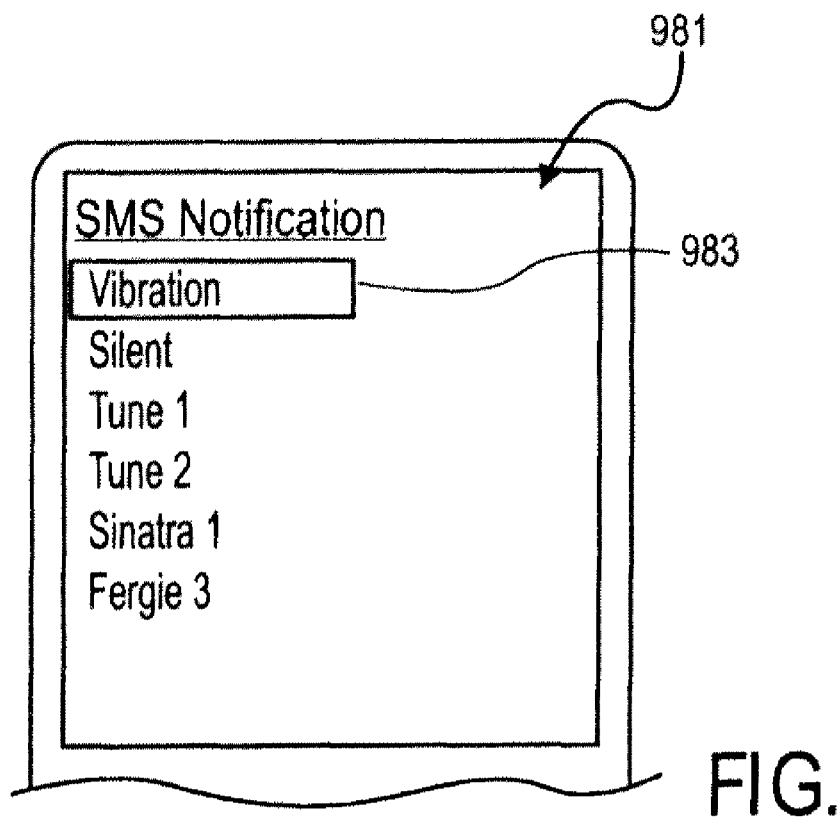

FIG. 9G shows the list of values available for a user to select in the field of SMS notification. The title 982 of SMS notification is on the top of the display with all the available values to be selected for this field. The user can then scroll down the list and select a value for the setting or field. For example, the field "vibration" 983 is selected. Upon selection of the value, the menu automatically reverts to the previous level, in this case, the list of fields in the profile or preference selected. When a user has finished editing of fields in a particular profile, the user may return to the User Profile menu 921 as shown in FIG. 9B and select another profile to edit or change. When a user has completely finished editing and making profile selections as in FIG. 9B, the user can back up to the main menu 901 FIG. 9A or exit the main menu entirely.

The user profiles as referenced in previous embodiments and descriptions include at least interface communications settings of the portable device. While some of the most common communication features that include, but are not limited to, ringer type, ringer volume, vibration pattern, email notification, SMS/text messaging notification, calendar alert, etc., other interface controls may be part of the user profile. Interface controls may include, but not limited to, the homepage of the web-browser, display brightness, calendar type, display brightness, touch pad sensitivity, background image of the display that may include, but are not limited to, colors, images, font size/type, icons, positions of icons etc. Programming of these interfaces allows a user to customize the portable device entirely to the user's preference and may present an opportunity for a user to distinguish his portable device from another user's device which may physically or in exterior appears the same. In one embodiment, a user may choose to play a short segment of a video or audio clip each time the phone is activated. Another example is a user's preference of how icons are displayed and which icons are displayed. Furthermore, a user may choose to have menus displayed as lists rather than iconic representations. Still, the user may choose to have different audio, tactile or visual alerts to be associated with switching into or activation of various profiles. Though user profiles may include common features such as typical communication alerts, the object of user profiles is to provide a user the capability to perform a complete customization of the user interface environment.

After the user profile has been changed in response to the manual actuation of a mechanical switch or a mechanical switch and an optional shift key, there may be an indication to the user which user profile is active or in use. FIGS. 11A-C illustrate the displays of portable devices with icons to represent different user profiles that are active or in use. FIGS. 11A-C illustrate three different icons, 1101A, 1101B and 1101C, representing a user profile for home, office, and meeting respectively. Generally when a portable date processing device, for example, a cell phone, is in operation, there is a display 1111 showing at least the time 1107, the level of battery power 1106, and the strength of the cellular signal 1105. Sometimes, in a sufficiently large display, even the menu of applications (not shown) and/or the calendar date 1108 may also be visible. FIGS. 11A, 11B and 11C differ from each other in that they each represent a different user profile. The user profile may have mirrored fields (as described above), or they may each have a different number of fields, as described earlier in this specification. The icon is shown to be on the top row of the display, but the placement of the icon can vary arbitrarily and may be displayed in any location on the screen as long as it is visible to the user. In one embodiment when an optional shift key is available, the icons indicating a visual alert and/or other audio and/or tactile alerts associated with the changing into or activation of the profiles only by concurrent activation of the shift key and the mechanical switch, may be different than those profiles activated only by the mechanical switch alone. There may be a numeric indication in addition to the original icon for the profile or the icon can be entirely different, the form of presentation may vary but some visual distinction may be used to notify a user of the different preference and/or different profiles that is selected.

As described earlier, besides a visual indication of the user profile with the aid of an icon, an audio or tactile alert may also be used. When a user is operating a vehicle or when the portable device is in the user's pocket, or when visualizing the display is inconvenient or impossible, a sound or tactile response would be beneficial to indicate a change in profile or preference or preference. In one embodiment each profile or preference is associated with a unique sound, tune, or audio clip etc. that is played whenever the profile or preference is activated. In another embodiment, each profile or preference is associated with a unique vibration pattern so the portable device vibrates when the profile or preference is activated. In still another embodiment, both the sound and the vibration that are unique to a profile or preference are used to alert the user whenever the profile or preference is activated. In one embodiment, the sound and/or vibration pattern is predetermined in the portable device, but in another embodiment, both the sound and/or the vibration pattern can be freely programmed to associate with the profile or preference by the user.

Figure 12:
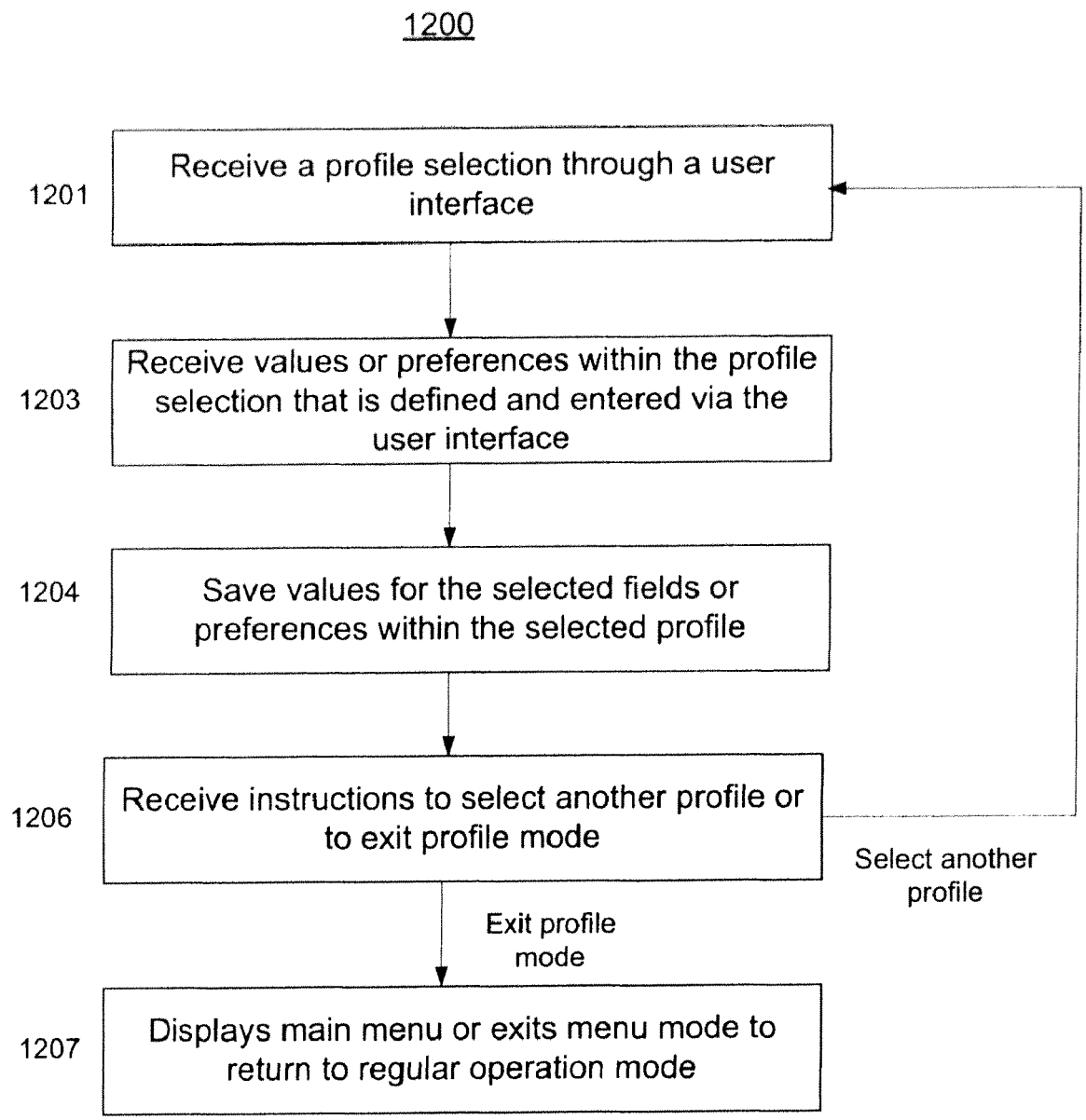
FIG. 12 is a flow chart of a method in programming settings in a preference of a profile in a portable device in accordance with one embodiment of the present invention.

FIG. 12 illustrates a method of programming and customizing profiles or preferences in a portable data processing device in accordance with the present invention. Flowchart 1200 shows a method of a portable data processing device receiving instructions to program or to customize a profile and/or a preference in a portable data processing device. Operation 1201 shows the portable data processing device receiving a selection to add or edit a user profile through a user interface such as a menu through either a listing view or an iconic selection. The portable data processing device receives instructions to edit an existing profile or add a profile, provided the maximum number of profiles is not exceeded. Operation 1203 shows the portable data processing device receiving a value or preference selection for a particular field within the profile selected. Note that at this stage, if the profiles are mirrored, the fields and number of fields are defined and fixed within each profile. However, if the profiles are not mirrored, then the portable data processing device may receive additions or selections of fields up to the maximum allowable fields for each profile. Operation 1204 shows that the portable data processing device saves all the values or preferences that are entered and selected by a user for the fields selected in the profile. Operation 1206 shows the portable data processing device receiving instructions either to exit the current profile or to select a different profile for further customization. If the command to exit is received, the portable data processing device may save the fields for the current profile and exit the edit mode for profiles and return to the main menu mode or to regular operation mode as shown in operation 1207. If instruction is received to edit another profile, the portable data processing device may save and update all the fields for the current profile, and allow selection of another profile by returning to operation 1201.

Figure 13:
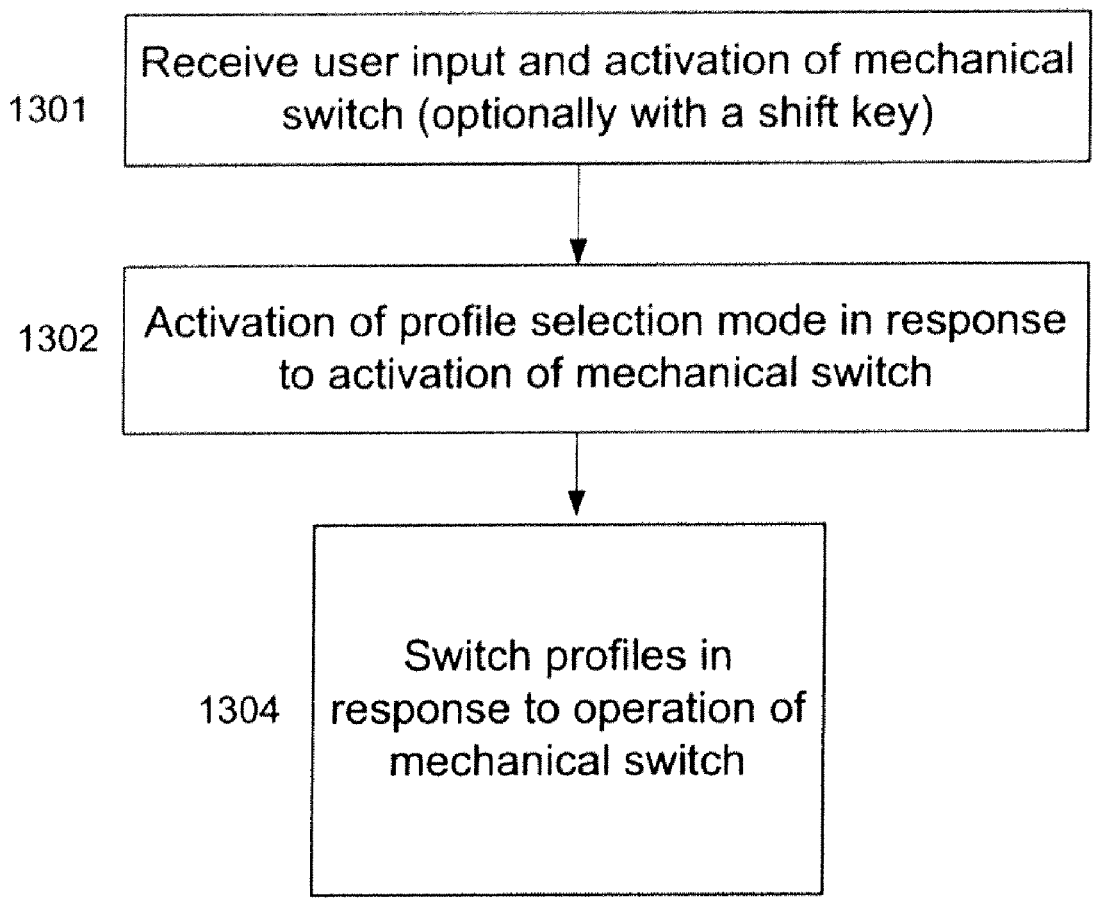
FIG. 13 is a flow chart of a method in changing profile and/or preference within a profile in a portable device using a mechanical switch in accordance with an embodiment of the present invention.

FIG. 13 shows a flow chart 1300 indicating the sequence of events that take place from operating the mechanical switch and optional shift key in a portable data processing device in accordance with the present invention. Operation 1301 shows the manual actuation of a mechanical switch. At the same time, if the optional shift key is also available, the processing logic will also check if the optional shift key is concurrently activated. In receiving this user input, the processing logic within the portable data processing device activates the profile and/or preference selection mode as in operation 1302 in response to the actuation of the mechanical switch and/or the concurrent activation of the mechanical switch and the shift key. Operation 1204 shows the changing or switching of profiles by the microprocessor in response to the output of the processing logic resulting from the manual actuation of the mechanical switch with or without concurrent actuation of the optional shift key. If the optional shift key is available, the processing logic will determine whether the profiles exclusively available to the concurrent actuation of the mechanical switch and the optional shift key are to be activated, based on whether the optional shift key and mechanical switch are simultaneously activated. If the optional shift key is concurrently activated, the processing logic may only switch among the exclusive profiles. However, if the optional shift key is not concurrently activated, the processing logic may switch among profiles which are exclusively activated by actuation of the mechanical switch only. If the optional shift key is available and only the optional key is actuated without the mechanical switch being activated, there will be no response by the processing logic. In a different embodiment, if there is no optional shift key present, each manual actuation of the mechanical switch (collective operations of 1201 and 1202) may simply result in a change in profile as in operation 1204, with the maximum number of profiles corresponding to a maximum number of switch positions.

Figure 14:
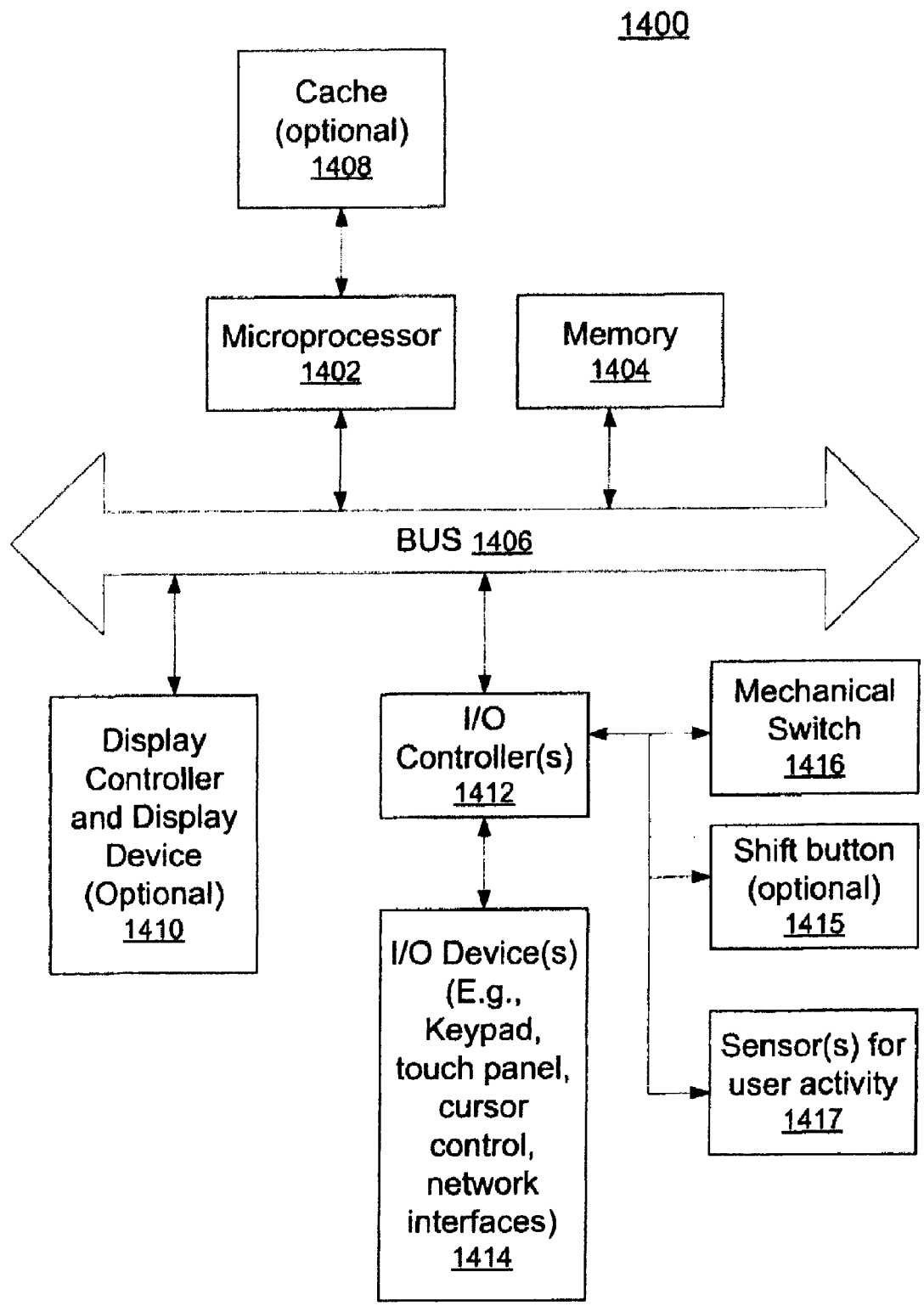
FIG. 14 is a block diagram of a digital processing system in accordance with one embodiment of the present invention.

FIG. 14 shows another example of a device according to an embodiment of the inventions. This device may include a processor, such as microprocessor 1402, and a memory 1404, which are coupled to each other through a bus 1406. The device 1400 may optionally include a cache 1408 which is coupled to the microprocessor 1402. This device may also optionally include a display controller and display device 1410 which is coupled to the other components through the bus 1406. One or more input/output controllers 1412 are also coupled to the bus 1406 to provide an interface for input/output devices 1414 and to provide an interface for one or more sensors 1416 which are for sensing user activity. The bus 1406 may include one or more buses connected to each other through various bridges, controllers, and/or adapters as is well known in the art. The input/output devices 1414 may include a keypad or keyboard or a cursor control device such as a touch input panel. Furthermore, the input/output devices 1414 may include a network interface which is either for a wired network or a wireless network (e.g. an RF transceiver). The mechanical switch 1416 and the optional shift button 1415 are connected to a processing logic through the I/O controllers 1412 before reaching the microprocessors. The sensors 1417 may be any one of the sensors described herein including, for example, a proximity sensor or an ambient light sensor. In at least certain implementations of the device 1400, the microprocessor 1402 may receive data from one or more sensors 1417 and may perform the analysis of that data in the manner described herein. For example, the data may be analyzed through an artificial intelligence process or in the other ways described herein. As a result of that analysis, the microprocessor 1402 may then automatically cause an adjustment in one or more settings of the device.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A portable data processing device comprising:
a display;
an input device;
a switch having a plurality of separate and independent switch positions which comprise a first switch position and a second switch position, the switch being configured to switch among a plurality of user interface profile settings which comprise a first profile setting and a second profile setting; and
at least one processor coupled to the input device and to the display and coupled to the switch to receive an output from the switch, the processor being configured to assign each one of a subset of the plurality of user interface profile settings to a corresponding one of the plurality of separate and independent switch positions of the switch such that the processor is configured to assign the first profile setting to the first switch position and is configured to assign the second profile setting to the second switch position of the plurality of separate and independent switch positions, and the processor is configured to determine and select, based on the output of the switch, one set of values from the plurality of user interface profile settings,
wherein a quantity of the plurality of user interface profile settings is more than a quantity of the plurality of separate and independent switch positions of the switch,
wherein the assigned profile settings of the plurality of user interface profile settings are less than the quantity of the plurality of user interface profile settings such that the assigned profile settings are subset of the quantity of plurality of user interface profile settings,
wherein the switch is configured to receive a user's finger to select one of the plurality of separate and independent switch positions, and when the user's finger contacts the switch, the switch positions of the switch change from one of the plurality of separate and independent switch positions to another of the plurality of separate and independent switch positions.

2. The portable data processing device as in claim 1 wherein the plurality of user interface profile settings each contains mirroring fields.

3. The portable data processing device as in claim 1 further comprising:
a radiofrequency (RF) transceiver coupled to the processor; and wherein the processor is configured to determine whether a user is communicating with another device through the RF transceiver.

4. The portable data processing device as in claim 3 wherein the input device is at least one of a keypad with discrete keys having an electrical switch for each discrete key representing at least one alphanumeric character and (b) a touch input panel having a selected area on the touch input panel for each key representing at least one alphanumeric character.

5. The portable data processing device as in claim 4 further comprising:
a speaker coupled to the RF transceiver;
a microphone coupled to the RF transceiver;
a storage device coupled to the processor, the storage device being configured to store media for playback on the portable data processing device.

6. The portable data processing device as in claim 1 wherein the display occupies at least 75 percent of a surface of a housing of the portable device.

7. The portable data processing device as in claim 6 wherein the input device comprises a touch input panel having a selected area on the touch input panel for each key representing at least one alphanumeric character and wherein the touch input panel is integrated with the display.

8. The portable data processing device as in claim 7 wherein the portable data processing device comprises a mobile telephone and wherein the media for playback comprises at least one of audio or video or audio and video combined.

9. The portable data processing device as in claim 1 wherein the input device comprises a multi-touch input panel which is integrated with the display and which is capable of determining multiple, separate concurrent touches on the multi-touch input panel and wherein the multi-touch input panel provides touch data derived from one or more touches to the multi-touch input panel.

10. The portable data process device as in claim 1 wherein the user interface profile settings further comprising at least one of background wallpaper settings, display brightness settings, communication settings, media settings and a combination of any of the aforementioned settings.

11. The portable data processing device as in claim 1 wherein an activation of the switch leads to at least one of an audio or tactile or a visual response confirming the activation of the switch.

12. A non-transitory computer readable storage medium storing executable program instructions which when executed by a portable data processing device cause the portable data processing device to perform a method comprising:
assigning each one of a subset of a plurality of user interface profile settings of a portable data processing device, comprising a first profile setting and a second profile setting, to a corresponding one of a plurality of separate and independent switch positions of a switch comprising a first switch position and a second switch position such that the first profile setting is assigned to the first switch position and the second profile setting is assigned to the second switch position of the plurality of separate and independent switch positions, wherein a quantity of the plurality of user interface profile settings is more than a quantity of the plurality of separate and independent switch positions of the switch, wherein the assigned profile settings of the plurality of user interface profile settings are less than the quantity of the plurality user interface profile settings such that the assigned profile settings are a subset of the quantity of the plurality of user interface profile settings, wherein the switch is configured to receive a user's finger to select one of the plurality of separate and independent switch positions, and when the user's finger contacts the switch, the switch positions of the switch change from one of the plurality of separate and independent switch positions to another of the plurality of separate and independent switch positions;

receiving an actuation of the switch to switch among the plurality of user interface profile settings;

receiving an electrical output corresponding to the actuation of the switch; and setting parameters in accordance with a selected user interface profile setting of the portable data processing device.

13. The non-transitory computer readable storage medium as in claim 12 wherein the plurality of user interface profile settings each contains mirroring fields.

14. The non-transitory computer readable storage medium as in claim 12 further comprising executable program instructions which when executed cause the portable data processing device to perform:

receiving an actuation of a shift button on the portable processing device simultaneous to the actuation of the dedicated mechanical switch; and receiving a different electrical output from the simultaneous actuations of both the shift button and the mechanical switch compared to the actuation of the mechanical switch alone at each of the plurality of separate and independent switch positions.

15. The non-transitory computer readable storage medium as in claim 12 wherein the portable data processing device further comprises:

a display;

an input device; and at least one processor coupled to the input device and to the display and coupled to the switch to receive an output from the switch.

16. The non-transitory computer readable storage medium as in claim 15 wherein the input device is at least one of a keypad with discrete keys having an electrical switch for each discrete key representing at least one alphanumeric character and (b) a touch input panel having a selected area on the touch input panel for each key representing at least one alphanumeric character.

17. The non-transitory computer readable storage medium as in claim 15 wherein the portable data processing device further comprises:

a speaker coupled to a RF transceiver;

a microphone coupled to the RF transceiver;

a storage device coupled to the processor, the storage device being configured to store media for playback on the portable data processing device.

18. The non-transitory computer readable storage medium as in claim 17 wherein the input device comprises a touch input panel having a selected area on the touch input panel for each key representing at least one alphanumeric character and wherein the touch input panel is integrated with the display and wherein the portable telephone device does not include a hinge.

19. The non-transitory computer readable storage medium as in claim 12 wherein the user interface profile settings further comprise at least one of background wallpaper settings, display brightness settings, communication settings, media settings and a combination of any of the aforementioned settings.

20. A portable data processing device comprising:

a multi-touch input panel configured to determine multiple, separate concurrent touches on the multi-touch input panel;

a display device integrated with the multi-touch input panel;

a switch having a plurality of separate and independent switch positions which comprise a first switch position and a second switch position, the switch being configured to switch among a plurality of user interface profile settings which comprise a first profile setting and a second profile setting; and at least one processor coupled to the multi-touch input panel and coupled to the switch to receive an output from the switch, the processor being configured to assign each one of a subset of the plurality of user interface profile settings to a corresponding one of the plurality of separate and independent switch positions of the switch such that the processor is configured to assign the first profile setting to the first switch position and is configured to assign the second profile setting to the second switch position of the plurality of separate and independent switch positions, and the processor is configured to determine and select, based on the output of the switch, a set of values from one of the plurality of user interface profile settings, wherein a quantity of the plurality of user interface profile settings is more than a quantity of the plurality of separate and independent switch positions of the switch, wherein the assigned profile settings of the plurality of user interface profile settings are less than the quantity of the plurality of user interface profile settings such that the assigned profile settings are a subset of the quantity of the plurality of user interface profile settings, wherein the switch is configured to receive a user's finger to select one of the plurality of separate and independent switch positions, and when the user's finger contacts the switch, the switch positions of the switch change from one of the plurality of separate and independent switch positions to another of the plurality of separate and independent switch positions.

21. The portable data processing device as in claim 20 wherein the plurality of user interface profile settings each contains mirroring fields.

22. The portable data processing device as in claim 21 further comprising:

a speaker coupled to a RF transceiver;

a microphone coupled to the RF transceiver;

a storage device coupled to the processor, the storage device being configured store media for playback on the portable data processing device.

23. The portable data process device as in claim 20 wherein the user interface profile settings further comprise at least one of background wallpaper settings, display brightness settings, communication settings, media settings and a combination of any of the aforementioned settings.

24. The portable data process device as in claim 20 wherein the activation of the switch leads to at least one of an audio or tactile or a visual response confirming the activation of the switch.

* * * * *